United States Patent
Kawase et al.

(10) Patent No.: US 7,039,481 B2
(45) Date of Patent: May 2, 2006

(54) PRODUCTION PLANNING SYSTEM

(75) Inventors: Kiyohisa Kawase, Koga (JP); Hajime Yuasa, Akishima (JP); Kazuhiko Maeda, Yokohama (JP); Yoshio Kobayashi, Takasaki (JP); Osamu Mishima, Isesaki (JP); Takashi Honma, Iruma (JP); Jun Akashi, Kodaira (JP); Hiroshi Yamada, Higashiyamato (JP); Kenichiro Masunaga, Hitachinaka (JP); Masahiro Koyama, Nishiyatsushiro (JP); Kenichi Funaki, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 180 days.

(21) Appl. No.: 10/357,470

(22) Filed: Feb. 4, 2003

(65) Prior Publication Data

US 2003/0149503 A1 Aug. 7, 2003

(30) Foreign Application Priority Data

Feb. 5, 2002 (JP) ............................ 2002-028545

(51) Int. Cl.
G06F 19/00 (2006.01)

(52) U.S. Cl. ....................................... 700/99; 700/103
(58) Field of Classification Search ................ 700/96, 700/99, 100, 101, 97, 103, 108; 705/8

See application file for complete search history.

(56) References Cited

U.S. PATENT DOCUMENTS

| | | | | |
|---|---|---|---|---|
| 4,827,423 A | * | 5/1989 | Beasley et al. | 700/96 |
| 5,748,470 A | | 5/1998 | Hager, III et al. | 364/187 |
| 5,983,194 A | * | 11/1999 | Hogge et al. | 705/7 |
| 6,195,590 B1 | * | 2/2001 | Powell | 700/36 |
| 6,363,291 B1 | | 3/2002 | Nagaoka et al. | 700/100 |
| 6,546,300 B1 | * | 4/2003 | Fukuda et al. | 700/100 |
| 2004/0158339 A1 | * | 8/2004 | Kawase et al. | 700/97 |

FOREIGN PATENT DOCUMENTS

| JP | 2000-10606 | | 1/2000 |
|---|---|---|---|
| JP | 2002-169605 | * | 6/2002 |

* cited by examiner

Primary Examiner—Leo Picard
Assistant Examiner—Steven R. Garland
(74) Attorney, Agent, or Firm—Miles & Stockbridge PC

(57) ABSTRACT

The production of semiconductor devices manufactured through a plurality of manufacturing sites is unitarily managed and an appropriate production plan is instructed. A computer projects a production plan of an entire company based on various information. The production plan is provided to each manufacturing site as a production instruction and provided to each business person or customer as a storing reply or an order accepting period reply. If the projected production plan (possible production volume) does not coincide with a production plan (necessary production volume), parameters obtained by correcting production allocation, production capability, lead time, yield and the like are re-input from a parameter input terminal. Based on the corrected parameters, the computer re-projects the production plan and projects an optimum production plan.

6 Claims, 29 Drawing Sheets

FIG. 9

| Process | item name | process code | process name | apparatus name | apparatus information sheet | number of apparatuses | processing time | operation time |
|---|---|---|---|---|---|---|---|---|
| C08ED | HD6473258F10 | C12201 | P-SiO(1) | plasma CVD | K42T0001 | 4 | 5 minutes | 24h |
| | | C12202 | BPSG | atmospheric pressure CVD | K42T0002 | 3 | 10 minutes | 24h |
| | | C12203 | F-SiL | atmospheric pressure CVD | K42T0003 | 1 | 10 minutes | 24h |
| | | C12204 | Ar annealing | annealing system | K42T0004 | 3 | 30 minutes | 8h |
| | | ... | | | | | | |
| | HD6473258F15 | | | | | | | |
| | ... | | | | | | | |

FIG. 11

| Factory | item name | cost process | operation step | work-in-process | actual result | production plan | | | | | | | | | |
|---|---|---|---|---|---|---|---|---|---|---|---|---|---|---|---|
| | | | | | | 8/22 | 8/23 | 8/24 | 8/25 | 8/26 | ... | 10/30 | 10/31 | '01/11 | '01/12 |
| IT | D12320VTE254 | 102 | M10201 | 0 | 50 | 0 | 0 | 0 | 0 | 0 | | 0 | 0 | 0 | 0 |
| | | 102 | M10202 | 0 | 50 | 0 | 0 | 0 | 0 | 0 | | 0 | 0 | 0 | 0 |
| | | 102 | M10203 | 0 | 50 | 0 | 0 | 0 | 0 | 0 | | 0 | 0 | 0 | 0 |
| | | 122 | M12201 | 50 | 0 | 25 | 25 | 0 | 0 | 0 | | 0 | 0 | 0 | 0 |
| | | 122 | M12202 | 0 | 0 | 0 | 25 | 25 | 0 | 0 | | 0 | 0 | 0 | 0 |
| | | 122 | M12203 | 0 | 0 | 0 | 0 | 25 | 25 | 0 | | 0 | 0 | 0 | 0 |
| | | 122 | M12204 | | ... | | | | | | | | | | |
| | | 150 | M15001 | 0 | 0 | 0 | 0 | 0 | 0 | 0 | | 23 | 23 | 151 | 162 |
| | | 150 | M15002 | 0 | 0 | 0 | 0 | 0 | 0 | 0 | | 0 | 23 | 151 | 162 |
| | | 150 | M15003 | 0 | 0 | 0 | 0 | 0 | 0 | 0 | | 0 | 0 | 151 | 162 |

FIG. 12

[(Semi)TOP] [menu] [regress] [regress and develop] [return] [plan start time] 20010911

Item name   progress : vertical development inventory [2-10HD6433258D51E-6]   ENTER | FILE output

| process | STAGE | item name | HCODE | | department 0109 | 0110 | 0111 | 0112 | 0201 | OP | yield | F [day] | I [second] number of work-in-process items | number of LOTS |
|---|---|---|---|---|---|---|---|---|---|---|---|---|---|---|
| 2- | 10 | HD6433258D51E-6 | Pw353761 | 29 | 0 | 0 | 0 | 0 | 0 | | | | | |
| 2- | 20 | HD6433258D51E-6 | Pw353761 | KFWT | 100 | 100 | 100 | 100 | 100 | 25 | 95.83 | 1.00 | 0 | 0 |
| 2- | 30 | HD6433258D51E-6 | Pw353761 | KFWT | 100 | 100 | 100 | 100 | 100 | 1 | 100.00 | 0.00 | 0 | 0 |
| 1C | 40 | HD6433258D51E | Ow3537 | H12 | 100 | 100 | 100 | 100 | 100 | 1 | 100.00 | 0.33 | 0 | 0 |
| 1C | 50 | HD6433258D51E | Ow3537 | H12 | 100 | 100 | 100 | 100 | 100 | 9 | 99.30 | 2.88 | 1 | 2 |
| 1C | 60 | HD6433258D51E | Ow353700 | H23 | 100 | 100 | 100 | 100 | 100 | 6 | 98.90 | 2.14 | 0 | 0 |
| | 80 | HD6433258D51E | Ow353700 | B51 | 100 | 100 | 100 | 100 | 100 | 1 | 100.00 | 1.50 | 0 | 0 |
| | 90 | HD6433258D51E | Ow353700 | S82 | 100 | 100 | 100 | 100 | 100 | 1 | 100.00 | 0.06 | 0 | 0 |

| process | STAGE | item name | HCODE | | department 0109 | 0110 | 0111 | 0112 | 0201 | OP | yield | F [day] | I [second] number of work-in-process items | number of LOTS |
|---|---|---|---|---|---|---|---|---|---|---|---|---|---|---|
| 2- | 10 | HD6433258D51E-6 | Pw353761 | 29 | 0 | 0 | 0 | 0 | 0 | | | | | |
| 2- | 20 | HD6433258D51E-6 | Pw353761 | KFWT | 100 | 100 | 100 | 100 | 100 | 25 | 95.83 | 1.00 | 0 | 0 |
| 2- | 30 | HD6433258D51E-6 | Pw353761 | KFWT | 100 | 100 | 100 | 100 | 100 | 1 | 100.00 | 0.00 | 0 | 0 |
| 17 | 40 | HD6433258D51E | Ow3537 | B18 | 100 | 100 | 100 | 100 | 100 | 1 | 100.00 | 0.06 | 0 | 0 |
| 17 | 50 | HD6433258D51E | Ow3537 | B18 | 100 | 100 | 100 | 100 | 100 | 7 | 99.60 | 4.56 | 0 | 2 |
| 17 | 60 | HD6433258D51E | Ow353700 | S82 | 100 | 100 | 100 | 100 | 100 | 6 | 98.40 | 1.71 | 0 | 0 |
| | 80 | HD6433258D51E | Ow353700 | B51 | 0 | 100 | 100 | 100 | 0 | 1 | 100.00 | 1.50 | 0 | 0 |
| | 90 | HD6433258D51E | Ow353700 | S82 | 100 | 100 | 100 | 100 | 100 | 1 | 100.00 | 0.06 | 0 | 0 |

FIG. 15

| item name | manufacturing site | N$^{th}$ month | (N+1)$^{th}$ month | (N+2)$^{th}$ month | (N+3)$^{th}$ month | (N+4)$^{th}$ month |
|---|---|---|---|---|---|---|
| HG73C789··· | A factory | 50% | 50% | 0% | 0% | 0% |
| HG73C789··· | B factory | 50% | 50% | 25% | 20% | 0% |
| HG73C789··· | C foundry | 0% | 0% | 75% | 80% | 100% |

FIG. 19

ROM switching instruction sheet issuance screen

| Determination | instruction date | base item name | names of ROM item | work-in-process base | number of switched items | WS division | name of customer | due-out |
|---|---|---|---|---|---|---|---|---|
| ☑ | 2000/09/04 | HD404044R-6 | HD404344RC87FP-6 | -25 | 25.00 | - | ABABABABABABA | 2000/ |
| ☑ | 2000/09/04 | HD404044R-6 | HD404344RC87FP-6 | -25 | 2.00 | - | CDCDCDCDCDC | 2000/ |
| ☐ | 2000/09/05 | HD404889-6 | HD404812A83TE-6 | -12 | 11.10 | - | EFEFEFEFEFEFE | 2000/ |
| ☐ | 2000/09/04 | HD6433238-6 | HD6433238L58F-6 | 0 | 0.20 | - | GHGHGHGHGH | 2000/ |
| ☐ | 2000/09/05 | HD6433258M-6 | HD6433258C57E-6 | 0 | 0.40 | - | ⋮ | 2000/ |
| ☐ | 2000/09/05 | HD6433258M-6 | HD6433258D04F-6 | 0 | 12.30 | - | ⋮ | 2000/ |
| ☐ | 2000/09/05 | HD6433258M-6 | HD6433258D17FJ-6 | 0 | 1.00 | - | ⋮ | 2000/ |
| ☐ | 2000/09/06 | HD6435328RN-6 | HD6433258D51E-6 | 0 | 0.20 | - | ⋮ | 2000/ |
| ☐ | 2000/09/05 | HD66732-1 | HD6435328RF19M-6 | 18 | 0.20 | - | ⋮ | 2000/ |
| ☐ | 2000/09/05 | HD66732-1 | HCD66732B11BP-1 | 18 | 25.00 | - | ⋮ | 2000/ |
| ☐ | 2000/09/06 | HG62E11B-6 | HCD66732B11BP-1 | 0 | 24.20 | - | ⋮ | 2000/ |
| ☐ | 2000/09/04 | HG62E58-6 | HG62E11B0FS-6 | 0 | 1.20 | - | ⋮ | 2000/ |
| ☐ | 2000/09/04 | HG62FH-0 | HG62E58R22FS-6 | 0 | 1.00 | - | ⋮ | 2000/ |
| ☐ | 2000/09/06 | HG62G010-6 | HG62F2C43FH-0 | 0 | 0.10 | - | ⋮ | 2000/ |
| ☐ | 2000/09/04 | HG62G019N-6 | HG62G010R19FBN-6 | 0 | 2.60 | - | ⋮ | 2000/ |
| ☐ | 2000/09/06 | HG62G027N-6 | HG62G019R83FB-6 | 0 | 3.80 | - | ⋮ | 2000/ |
| ☐ | 2000/09/06 | HG62G027N-6 | HG62G027R69F-6 | 0 | 2.20 | - | ⋮ | 2000/ |
|   |   |   | -6 | 0 | 0.20 | - |   | 2000/ |

Red letter: remaining switch target
Yellow background: instructed at the day

FIG. 20

ROM switching instruction sheet issuance screen

"ROM switching instruction data was created. Do you want to print out data?"
Yes(Y)  No(N)

ROM switchover instruction sheet person in charge: ○○ ○○○

| base item name | ROM item name | customer name | process | 9/4 | 9/5 | 9/6 | 9/7 | 9/17 |
|---|---|---|---|---|---|---|---|---|
| HD64333-2 | HD64333FB-2 | TEL | C01LT | 50 | | | | |
| HD64333-2 | HD64333TE-2 | TEL | C01LT | | 17 | | | |

FIG. 25

| order No. | item name code | volume | requested delivery date | reply result | delay days |
|---|---|---|---|---|---|
| AP000843 | 8080DF2357TE20 | 200 | 19991208 | 2 | 0 | detailed result

| No | possible shipping date | possible shipping volume |
|---|---|---|
| 1 | 1999/12/08 | 150 |
| 2 | 1999/12/08 | 50 | register plan created date : 1999/12/02
(display unit, case)

| day's schedule | OG | repeat | reserved | demand estimation |
|---|---|---|---|---|
| 12/08 | 0 | 0 | 6(6) | 133 |
| 12/09 | 0 | 0 | 0(0) | 87 |
| 12/10 | 0 | 0 | 0(0) | 1746 |
| 12/11 | 0 | 0 | 0(0) | 129 |
| 12/12 | 0 | 0 | 0(0) | 84 |
| 12/13 | 0 | 0 | 0(0) | 55 | next page 0    20    40

FIG. 26 repeat order acceptance period reply details ≪output all cases≫ data : 2001/09/06

| department | order receiving side | orderer | customer name | management code | item name | order No. | delivery date | storing instruction date | remaining orders | stock reserve | arrangement day | delay | latest storing estimation date | initial storing estimation date |
|---|---|---|---|---|---|---|---|---|---|---|---|---|---|---|
| HDDS | 100S | 000380 | ABCDEFG | RVDO | D3229IR29A | DH23456 | 01/09/03 | 01/09/10 | 46,387 | 1,343 | 01/08/20 | 22 | 01/08/23 | 01/08/21 |
| HDDS | 100S | 000380 | HIJKLMN | RVDO | D3555IR29B | D1125655 | 01/09/03 | 01/10/02 | 33,000 | 0 | 01/08/10 | 32 | 01/10/02 | 01/10/02 |
| HDDS | 100S | 000380 | HIJKLMN | RVDO | D3555IR293 | D1555451 | 01/09/03 | 01/09/03 | 537 | 0 | 01/08/13 | 47 | 01/09/21 | 01/10/01 |
| HDDS | 100S | 000380 | HIJKLMN | RVDO | D3555IR29B | D1324453 | 01/09/03 | 01/09/03 | 300 | 0 | 01/08/30 | 22 | | |
| HDDS | 100S | 000380 | ABCDEFG | RVDO | D3555IR29B | D1626459 | 01/09/14 | 01/09/01 | 3,000 | 0 | 01/08/08 | 14 | | |
| HDDS | 100S | 000380 | ABCDEFG | RVDO | D3555IR29B | D1123458 | 01/09/03 | 01/09/10 | 2,000 | 0 | 01/08/20 | 14 | | |
| HDDS | 100S | 000380 | ABCDEFG | RVDO | D3555IR29B | D1126548 | 01/09/07 | 01/09/13 | 11,000 | 0 | 01/08/08 | 3 | | |
| HDDS | 100S | 000380 | ABCDEFG | RVDO | D3229IR29A | D1195123 | 01/09/20 | 01/09/17 | 2,740 | 0 | 01/08/16 | 18 | 01/09/28 | 01/08/21 |
| HDDS | 100S | 000380 | ABCDEFG | RVDO | D3229IR29A | D1123235 | 01/09/14 | 01/09/28 | 87 | 0 | 01/08/08 | 19 | 01/09/18 | 01/09/23 |
| HDDS | 100S | 000380 | ABCDEFG | RVDO | D3229IR29A | D1564756 | 01/09/06 | 01/09/03 | 12,000 | 0 | 01/08/15 | 29 | 01/10/09 | 01/08/20 |
| HDDS | 100S | 000380 | ABCDEFG | RVDO | D3229IR29A | D1777754 | 01/10/18 | 01/09/23 | 120 | 0 | 01/08/20 | 22 | 01/09/10 | 01/08/22 |
| HDDS | 100S | 000380 | ABCDEFG | RVDO | D3229IR29A | D1896353 | 01/09/03 | 01/09/03 | 300 | 0 | 01/08/08 | 23 | 01/09/13 | 01/09/10 |
| HDDS | 100S | 000380 | ABCDEFG | RVDO | D3229IR29A | D1663451 | 01/09/14 | 01/09/13 | 3,000 | 0 | 01/08/08 | 33 | 01/10/02 | 01/09/13 |
| HDDS | 100S | 000380 | ABCDEFG | RVDO | D3229IR29A | D1987452 | 01/09/09 | 01/09/15 | 139 | 0 | 01/08/16 | 18 | 01/09/10 | 01/08/22 |

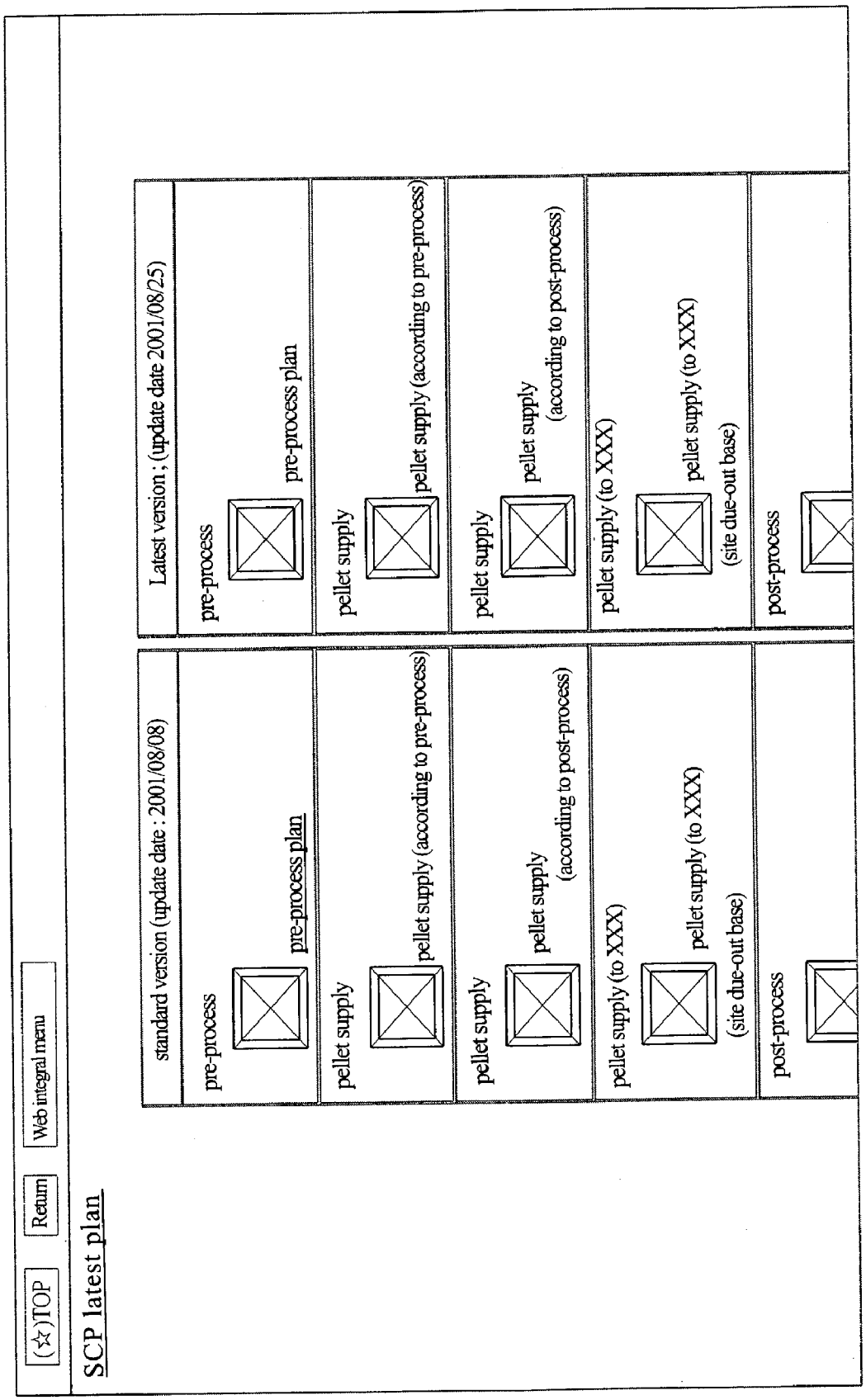

FIG. 29

SCP processing date: 2001/08/25

| in charge | item name | base item name | stage | cost process | reserve (process) | reserve (during transportation) | result | Aug. 25 | Aug. 26 | Aug. 27 | ... | Oct. 29 | Oct. 30 |
|---|---|---|---|---|---|---|---|---|---|---|---|---|---|
| IT | D12312S2-T | D12312S2-T | 70 | 99 | 150 | 0 | 9 | 0 | 0 | 0 | 0 | 0 | 0 |
| IT | D12312S2-T | D12312S2-T | 70 | 99 | 181 | 0 | 9 | 0 | 0 | 0 | 0 | 0 | 0 |
| IT | D12312S2-T | D12312S2-T | 70 | 99 | 188 | 0 | 9 | 0 | 0 | 0 | 0 | 0 | 0 |
| IT | D12312S2-T | D12312S2-T | 70 | 99 | 900 | 0 | 9 | 0 | 0 | 0 | 0 | 0 | 0 |
| IT | D12312VTE20-4 | D12312S2-T | 10 | 0 | 102 | 0 | 0 | 0 | 0 | 0 | 0 | 0 | 0 |
| IT | D12312VTE20-4 | D12312VTE20-4 | 10 | 1 | 122 | 0 | 0 | 0 | 0 | 0 | 0 | 0 | 0 |
| IT | D12312VTE20-4 | D12312VTE20-4 | 10 | 2 | 118 | 0 | 0 | 0 | 0 | 0 | 0 | 0 | 0 |
| IT | D12312VTE20-4 | D12312VTE20-4 | 10 | 3 | 100 | 0 | 0 | 0 | 0 | 0 | 0 | 0 | 0 |
| IT | D12312VTE20-4 | D12312VTE20-4 | 10 | 4 | 150 | 0 | 0 | 0 | 0 | 0 | 0 | 0 | 0 |
| IT | D12312VTE20-4 | D12312VTE20-4 | 20 | 0 | 181 | 0 | 0 | 0 | 0 | 0 | 0 | 0 | 0 |
| IT | D12312VTE20-4 | D12312VTE20-4 | 20 | 1 | 188 | 0 | 0 | 0 | 0 | 0 | 0 | 0 | 0 |
| IT | D12312VTE20-4 | D12312VTE20-4 | 30 | 0 | 900 | 0 | 0 | 0 | 0 | 0 | 0 | 0 | 0 |
| IT | D12320VTE25-4 | D12312VTE20-4 | 10 | 0 | 102 | 0 | 50 | 25 | 0 | 0 | 0 | 25 | 0 |
| IT | D12320VTE25-4 | D12320VTE25-4 | 10 | 1 | 122 | 0 | 50 | 0 | 0 | 24.9 | 0 | 25 | 0 |
| IT | D12320VTE25-4 | D12320VTE25-4 | 10 | 2 | 118 | 50 | 50 | 0 | 0 | 0 | 0 | 0 | 0 |
| IT | D12320VTE25-4 | D12320VTE25-4 | 10 | 3 | 100 | 0 | 0 | 0 | 0 | 0 | 0 | 0 | 0 |
| IT | D12320VTE25-4 | D12320VTE25-4 | 10 | 4 | 150 | 50 | 0 | 0 | 0 | 0 | 0 | 0 | 0 |
| IT | D12320VTE25-4 | D12320VTE25-4 | 20 | 0 | 181 | 0 | 0 | 0 | 0 | 0 | 0 | 0 | 0 |

PRODUCTION PLANNING SYSTEM

TECHNICAL FIELD OF THE INVENTION

The present invention relates to a production planning system and particularly relates to an effective technique applied to the integral production planning of semiconductor devices which are manufactured through a plurality of manufacturing sites.

BACKGROUND OF THE INVENTION

In manufacturing a semiconductor device, there are a pre-process for forming semiconductor elements and wiring patterns and the like on a semiconductor wafer, and a post-process for dicing the semiconductor wafer into semiconductor chips, packaging and assembling them into a finished product. To perform processings of the pre-process and the post-process, it is known that a plurality of manufacturing processes and manufacturing sites (manufacturing factories) are prepared and that the manufacturing processes are divided among the factories.

SUMMARY OF THE INVENTION

According to the studies of the inventors of the present invention, the production planning of semiconductor devices for which a lot of manufacturing sites exist as stated above, proceeds as follows. For example, an integral center, which integrates manufacturing sites, collects information once a month, creates a monthly production plan, and distributes the plan to each manufacturing site. Each manufacturing site manufactures semiconductor devices while managing its own production plan based on the distributed production plan.

The semiconductor device production planning of this type is described in detail in, for example, Japanese Patent Application Laid-Open No. 2000-10606. A system for calculating a required volume and required occurrence days while required time is allocated to a plurality of manufacturing sites which can manufacture semiconductor devices, and for obtaining an appropriate production plan is described in this publication.

However, the inventor of the present invention discovered that the conventional semiconductor device production planning technique stated above had the following disadvantages.

In the above-stated semiconductor device production planning, a production planning is only for a monthly production plan to manage a monthly target. Therefore, it is disadvantageously difficult to promptly reflect market conditions which are changing day by day in the production plan and to swiftly feed back a supply-demand fluctuation to the manufacturing sites.

Furthermore, a flow of semiconductor device manufacturing process is that of some intensive processes obtained by summarizing actual production operation steps. Due to this, the following disadvantages occur. An individual operation plan cannot be projected, it is difficult to thoroughly manage progress situations, and a production instruction and production management centered around a bottleneck step cannot be made.

Further, when a so-called foundry company to which only the manufacturing of semiconductors is committed is adopted, it is disadvantageously impossible to put the foundry company under production management as a part of a company involved and to create a final product finishing and storing plan for the entire company. This is because there are no collection means for collecting foundry company internal information including the production situation and delivery plan of the foundry company and fetching means for fetching the information into the production management of the company.

Further, in the manufacturing of semiconductor devices, the capability of a semiconductor device manufacturing apparatus largely influences the production progress. However, the capability of the apparatus is not set per apparatus but regarded as the volume of possible manufactured semiconductor devices of the entire production line. Due to this, the production capability of each production step is not fetched by the production planning projecting process, with the result that it is extremely difficult to track the bottleneck of the line.

Moreover, a device for observing the created production plan, i.e., a mechanism for visualizing the plan, sharing the plan among the sites and issuing the production instruction is not sufficiently provided. Due to this, even when a plan is created, the conventional system has a disadvantage of lack of functions of providing information on an observance situation and visualizing the plan so as to issue a production instruction to each manufacturing site to enable operations to be carried out as planned or so as to verify whether the operations are carried out as planned.

In addition, not only the entire production management but also the integral center, each of the manufacturing sites and a user interface between a semiconductor device manufacturer and each user have the following disadvantages.

First, the integral center is required to collect information on each manufacturing site before creating the production plan for overall semiconductor device production. It is difficult to collect information according to the actual situations of all the manufacturing sites every day or at intervals close to real time, and to create the production plan because of a large quantity of information and a large number of manufacturing sites and factories. Due to this, the integral center sometimes sets an ordinary standard value and uses it in place of the information.

In this case, there is a probability that the standard values become plan values different from actual production and production capability. Further, when semiconductor devices are manufactured at a plurality of manufacturing sites, the movement of work-in-process lots among the sites occurs. It is thereby necessary to grasp the work-in-process lots while the lots are being transported among the sites and to fetch the work-in-process information into the production plan projection. However, since information on the entire production model cannot be managed intensively, unitarily, it is disadvantageously very difficult to accurately grasp the work-in-process lots during this transportation.

Further, each manufacturing site exercises target production volume management of point processes (an initial process and a final process) and production management of intensive processes obtained by collecting some operation steps in a semiconductor manufacturing process which requires a lot of steps including an oxidation step, a diffusion step, a wiring step, a testing step, an assembly step and a selection step and long manufacturing time, thus paying attention to the follow-up of an estimated production volume. However, the production instruction function for attaining the estimated volume is insufficient and an instruction to a site is issued by a human attributable method which relies on the experience and intuition of production management department personnel.

Further, as for the user interface, the production plan information is mainly provided to each user by paper. This disadvantageously obstructs data from being freely worked into a format according to the purpose of the user and limits the range of the delivery and provision of information (basically to a production management department in a company).

Namely, this disadvantageously obstructs the use of information while taking advantage of the mobile environment which is being remarkably developed following the development of the Internet and the follow-up to businesses which are established under the borderless collaboration among the companies.

Furthermore, the content of information thus provided is limited to monthly production target values, thereby disadvantageously making it difficult to grasp order-related situations and the latest plan values.

It is an object of the present invention to provide a production planning system capable of unitarily managing the production of semiconductor devices which are manufactured through a plurality of manufacturing sites and instructing an appropriate production plan.

The above and other objects and novel features of the present invention will be readily apparent from the description of the specification and the accompanying drawings.

Among the inventions disclosed by the present application, the typical invention will be briefly and schematically described as follows.

1. The present invention provides a production planning system for projecting a production plan for semiconductor devices manufactured using a plurality of manufacturing sites, comprising: a plurality of site terminals provided at each of the manufacturing sites, and collecting production management information on the plurality of manufacturing sites, respectively; a production management computer totalizing a plurality of pieces of the production management information collected by the site terminals, and transmitting the totalized production management information according to a request, respectively; and a production management computer provided at a center which integrates the manufacturing sites, collecting the totalized production management information transmitted from the production management computer as necessary information, and batch projecting the production plan of each of the manufacturing sites based on the necessary information.

The other inventions of the present application will be briefly, schematically described as follows.

2. In the item 1, a foundry company entrusted with production is provided at each of the manufacturing site.
3. In the item 1 or 2, the production management computer checks a production distribution and a production constraint from the collected necessary information, and projects the production plan based on a check result.
4. In the item 3, the production constraint is a condition for quantitatively grasping a capability of a manufacturing apparatus and a capability of a facility.
5. In any one of the items 1 to 4, the production planning computer projects the production plan by setting a production allocation ratio to each of the manufacturing sites.
6. In any one of the items 1 to 5, the production planning system comprises: a production instruction terminal provided at each of the manufacturing sites, and displaying the production plan projected by the production management computer as a production instruction plan.
7. In any one of the items 1 to 6, the production instruction terminal outputs a switching instruction to switch a common process part to an individual process part for a semi-custom item, to the production planning computer.
8. In any one of the items 1 to 6, the production instruction terminal searches a database in the production management computer, and displays a storing estimation date in response to an order from a customer.
9. In any one of the items 1 to 8, the production planning system comprises a situation check terminal connected to the production management computer, searching the database in the production management computer according to a request, and displaying a production progress situation in response to a demand from the customer.
10. In the item 9, the situation check terminal searches a latest storing estimation date for a delivery date of delivering a product in response to the order, and displaying the latest storing estimation date.
11. In the item 9 or 10, the situation check terminal searches a latest storing estimation date for a delivery date of an ordered product, and displaying the latest storing estimation date.

BRIEF DESCRIPTIONS OF THE DRAWINGS

FIG. 9 is an example of the display when process production capability data shown in FIG. 8 is fetched;

FIG. 11 is an explanatory view showing one example of basic items of production plan information;

FIG. 12 is an explanatory view showing the content of data on a production model in the production plan shown in FIG. 11;

FIG. 15 is an explanatory view showing one example of the display of the production allocation ratios shown in FIG. 14;

FIG. 19 is an explanatory view showing one example of a switching instruction following that shown in FIG. 18;

FIG. 20 is an explanatory view showing one example of a switching instruction following that shown in FIG. 19;

FIG. 23 is an explanatory view showing one example of a production plan search information menu screen displayed on an order input terminal or the like;

FIG. 24 is an explanatory view showing one example of provided information displayed on the order input terminal or the like;

FIG. 25 is an explanatory view showing one example of provided information following that shown in FIG. 24;

FIG. 26 is an explanatory view showing one example of provided information following that shown in FIG. 25;

FIG. 27 is an explanatory view showing one example of provided information following that shown in FIG. 26;

FIG. 29 is an explanatory view showing one example of provided information following that shown in FIG. 28.

DESCRIPTION OF THE PREFERRED EMBODIMENTS

The embodiment of the present invention will be described hereinafter in detail with reference to the drawings.

Figure 1:
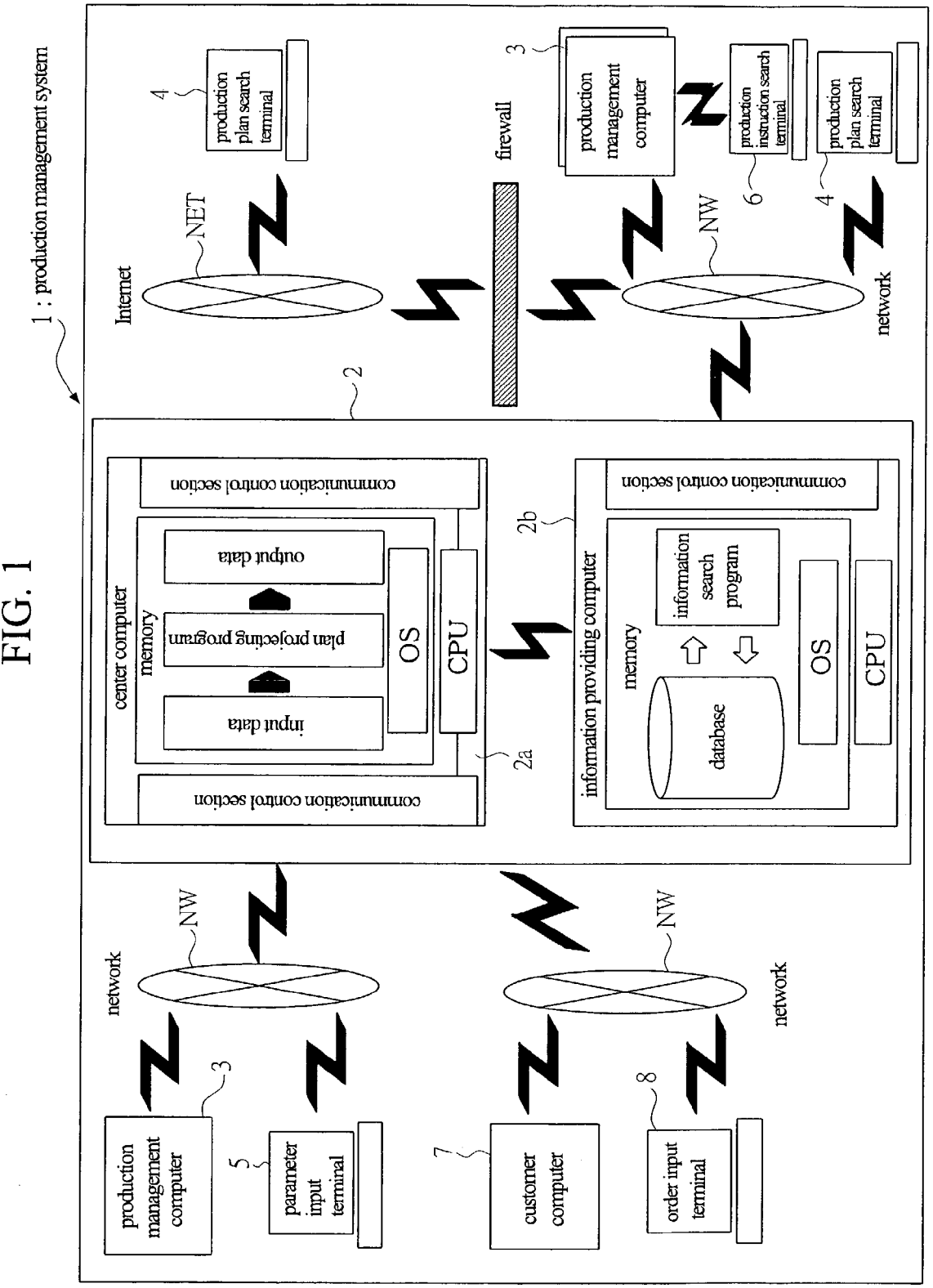
FIG. 1 is a block diagram showing the configuration of a production management system in one embodiment according to the present invention.
Figure 2:
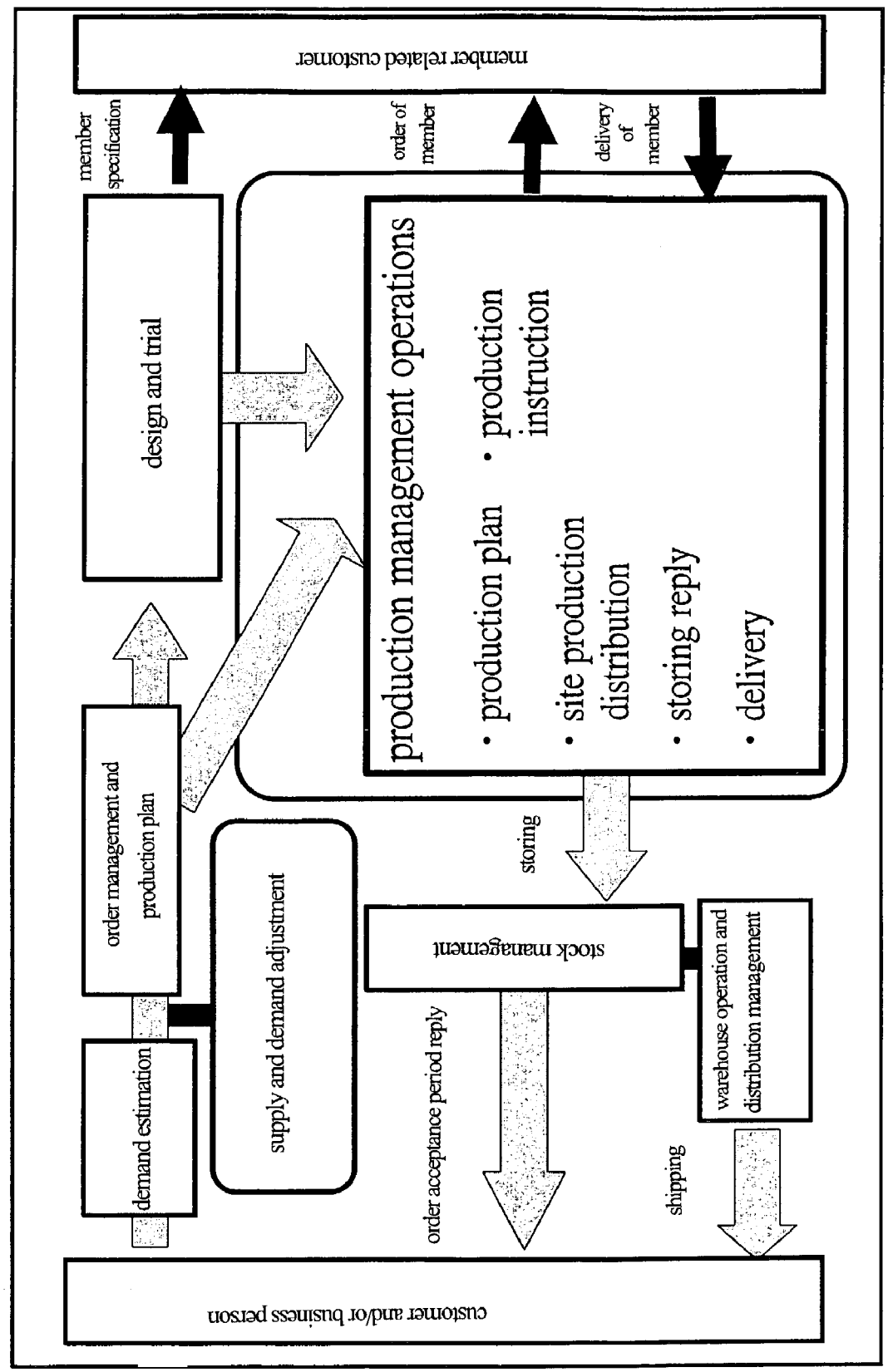
FIG. 2 is an explanatory view of a supply chain in the production management system shown in FIG. 1.
Figure 3:
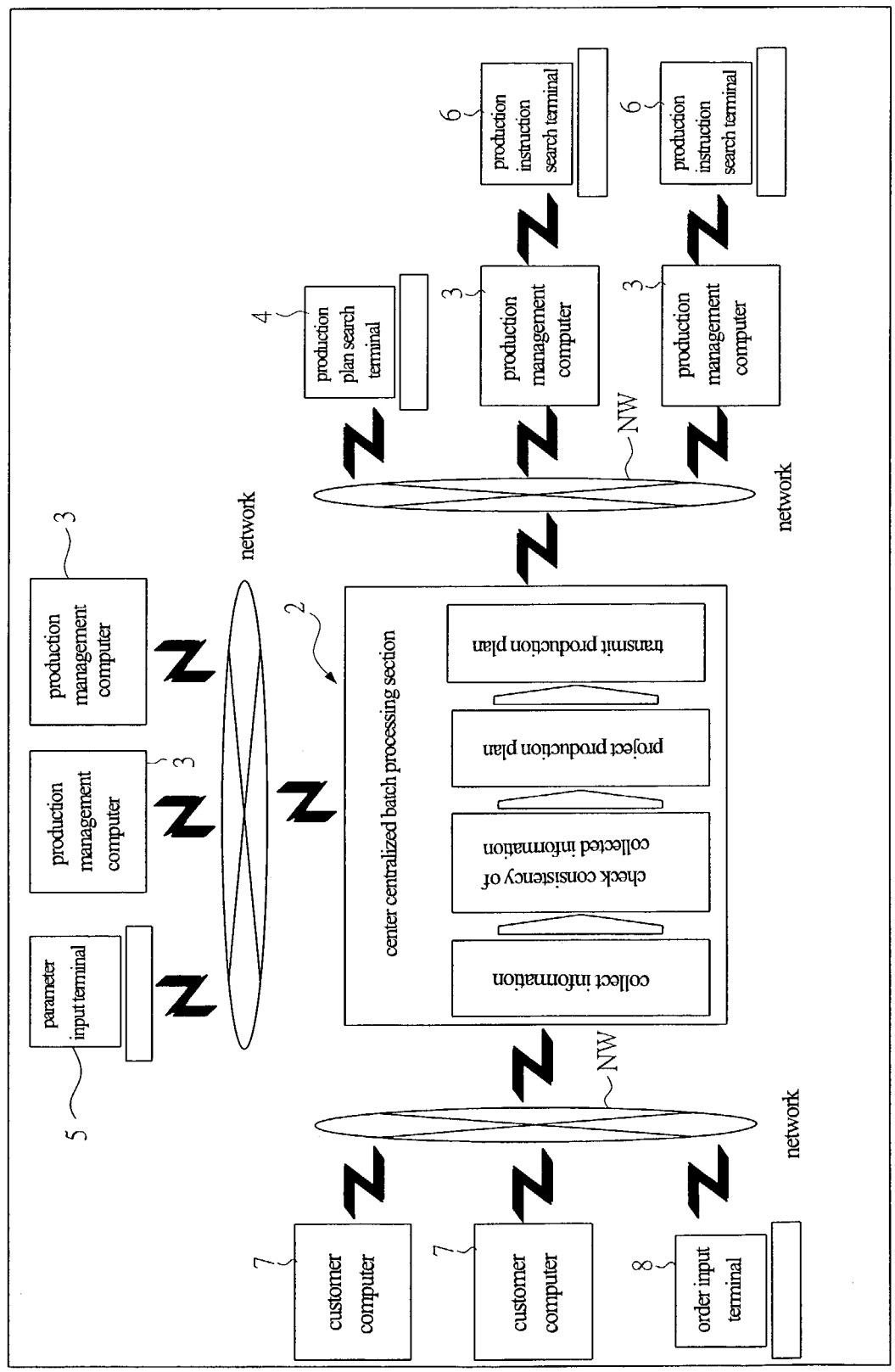
FIG. 3 is an explanatory view for information processing in the production management system shown in FIG. 1.
Figure 4:
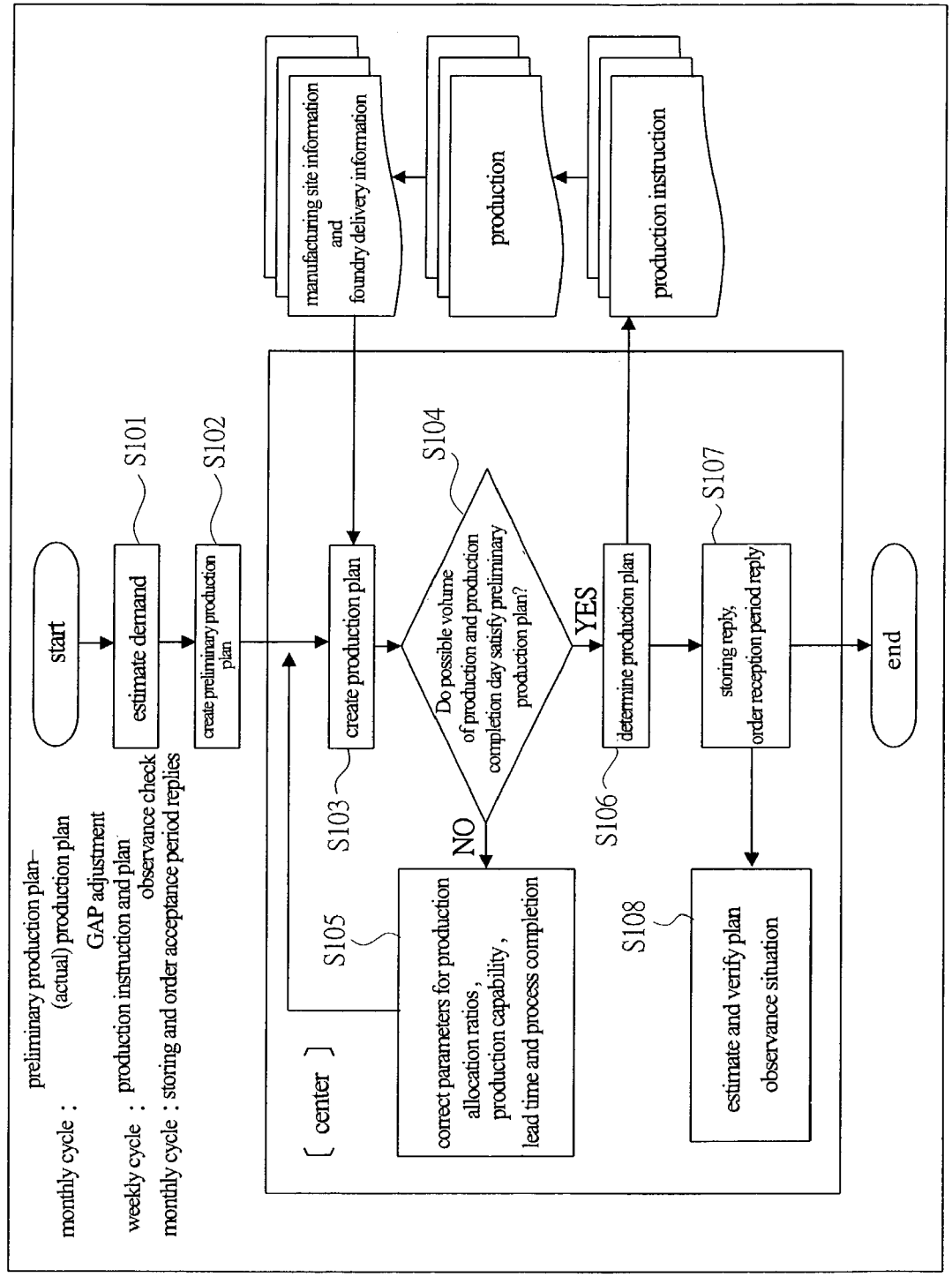
FIG. 4 is a flow chart of semiconductor device production management in the production management system shown in FIG. 1.
Figure 5:
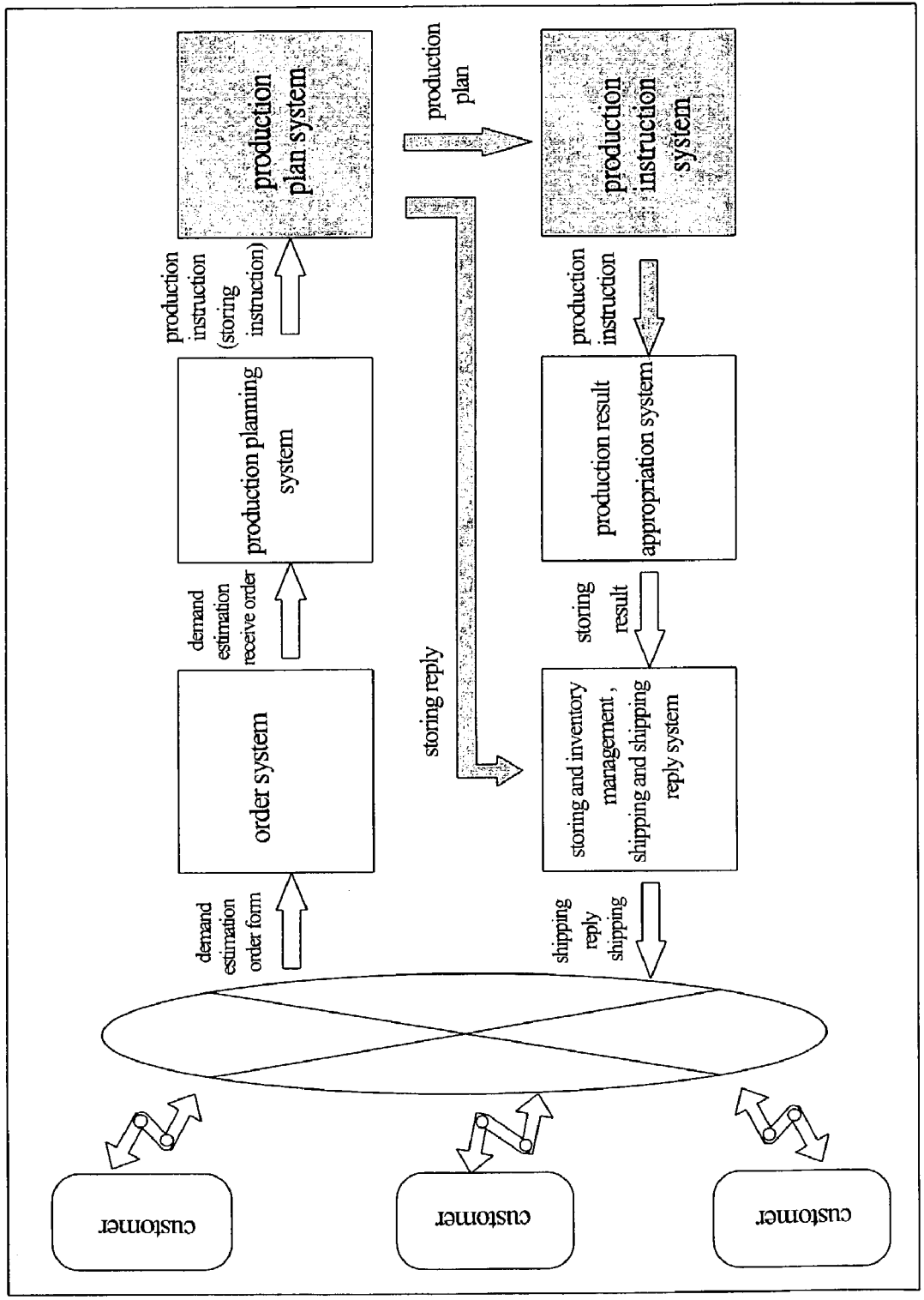
FIG. 5 is an explanatory view showing the relationship among respective operation systems which constitute a target semiconductor supply chain of the production management system shown in FIG. 1.
Figure 6:
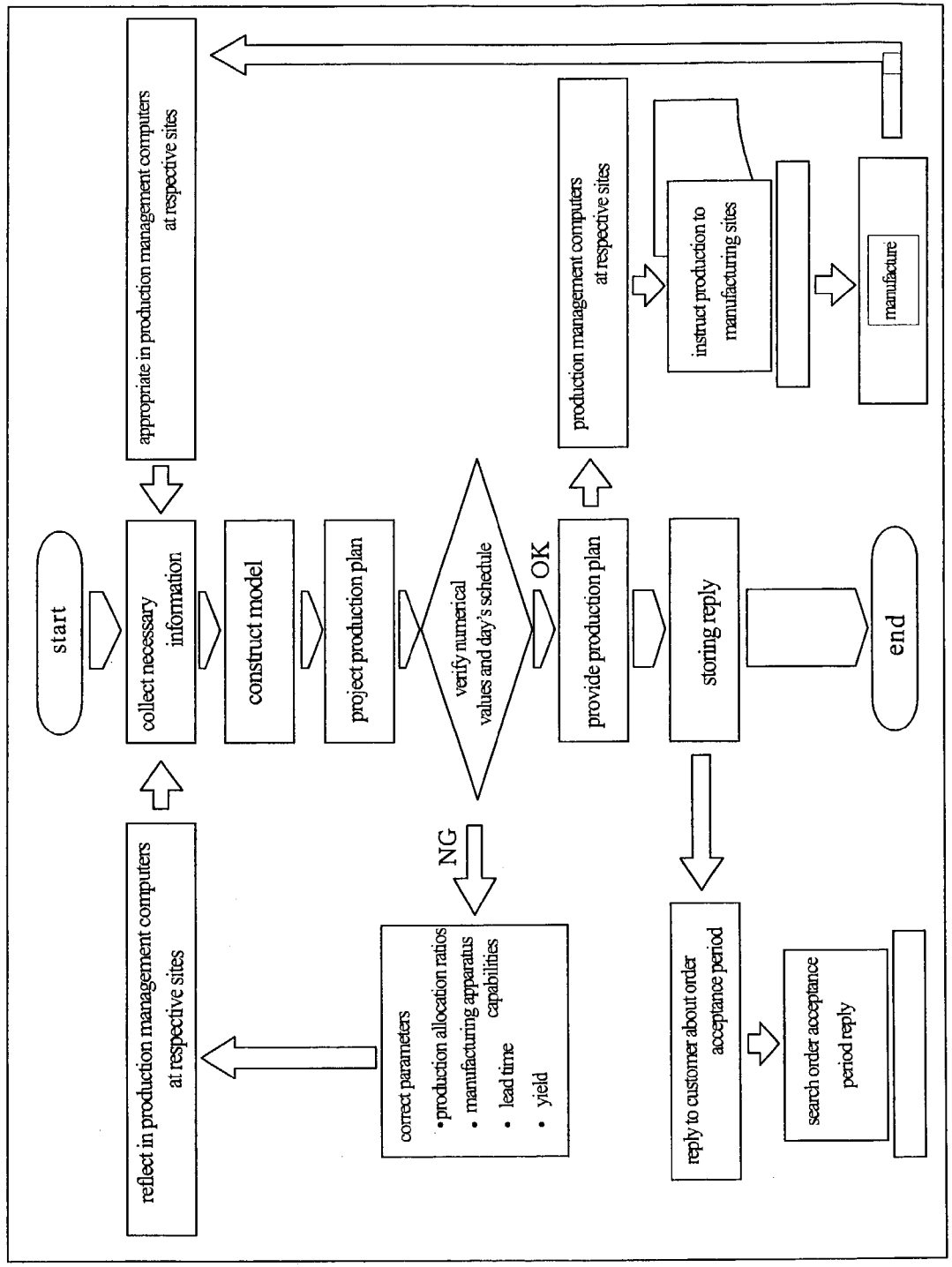
FIG. 6 is an explanatory view showing an operation flow for creating a production plan in the production management system shown in FIG. 1.
Figure 7:
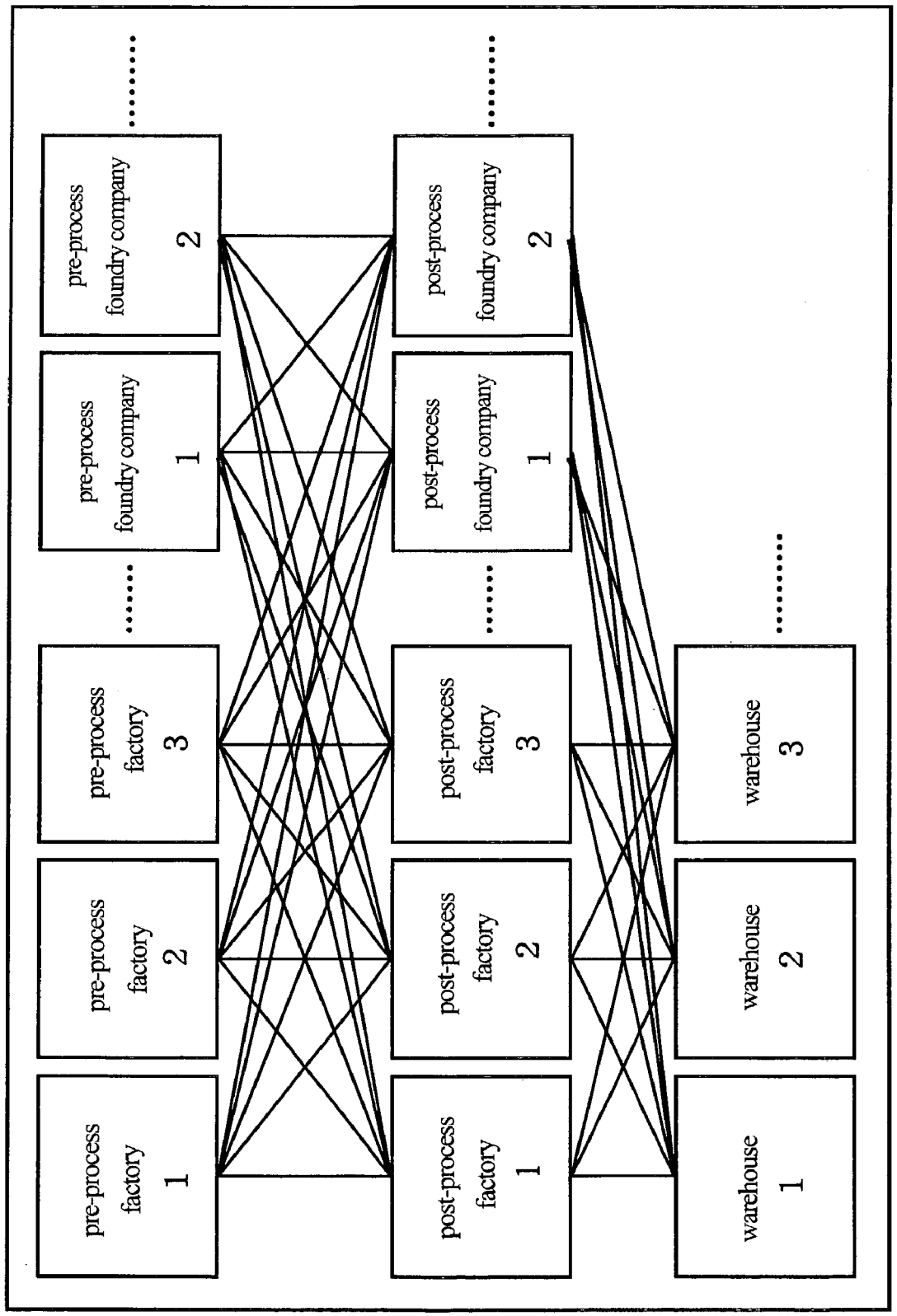
FIG. 7 is an explanatory view showing one example of a production model which can be handled by the production management system shown in FIG. 1.
Figure 8:
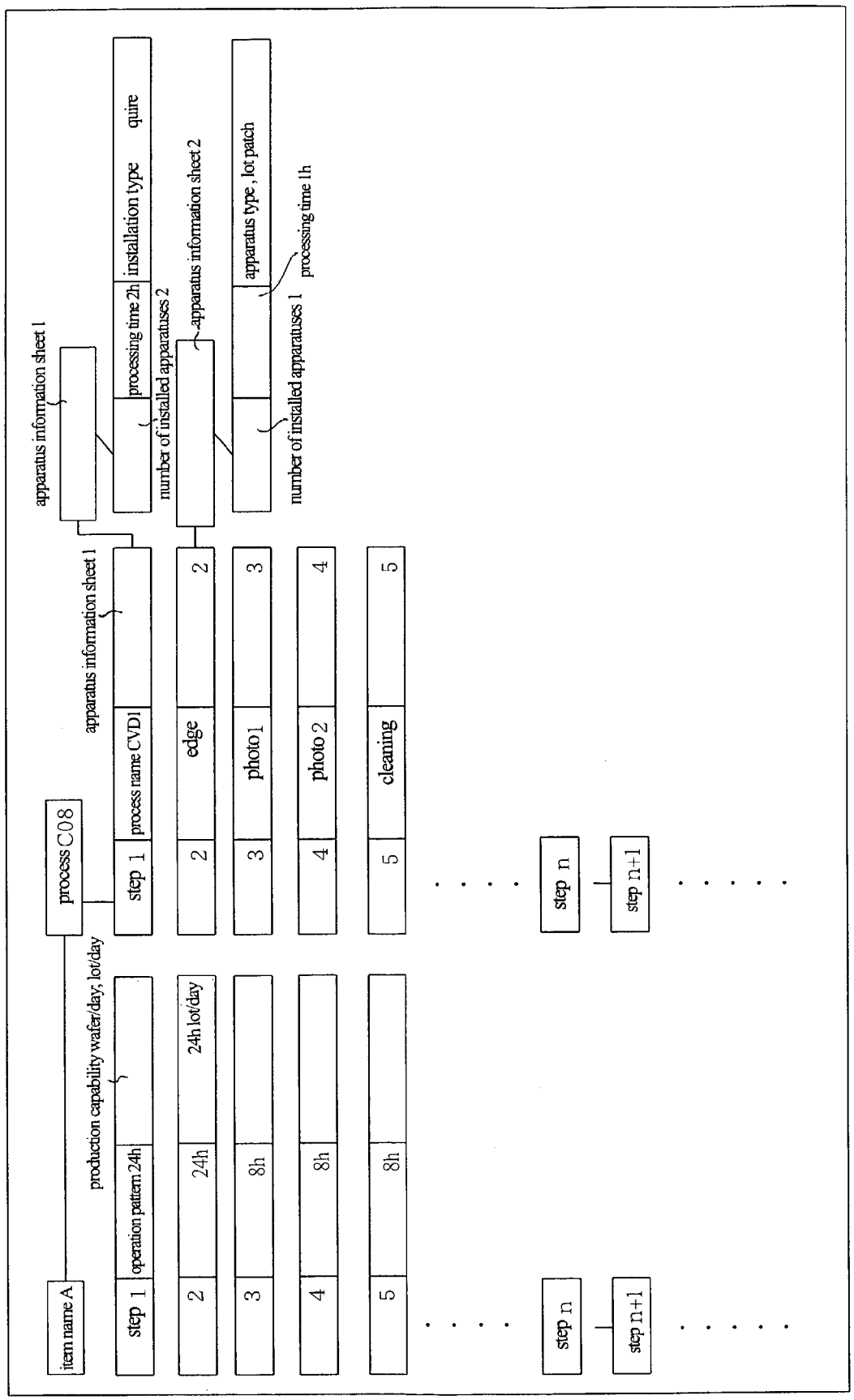
FIG. 8 is an explanatory view showing one example of a production capability fetched by a center computer provided in the production management system shown in FIG. 1.
Figure 10:
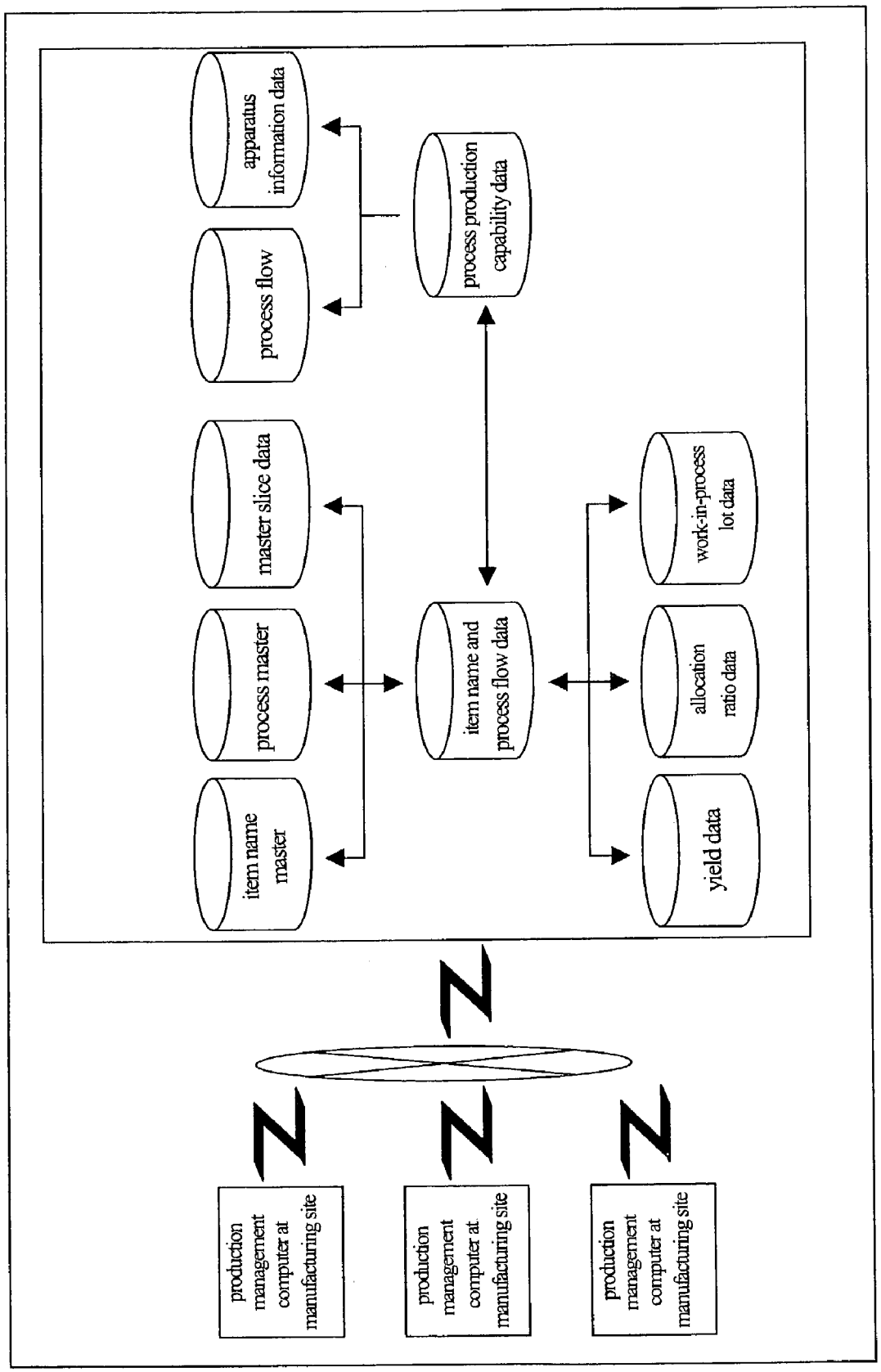
FIG. 10 is an explanatory view for consistency check conducted by the center computer of the production management system shown in FIG. 1.
Figure 13:
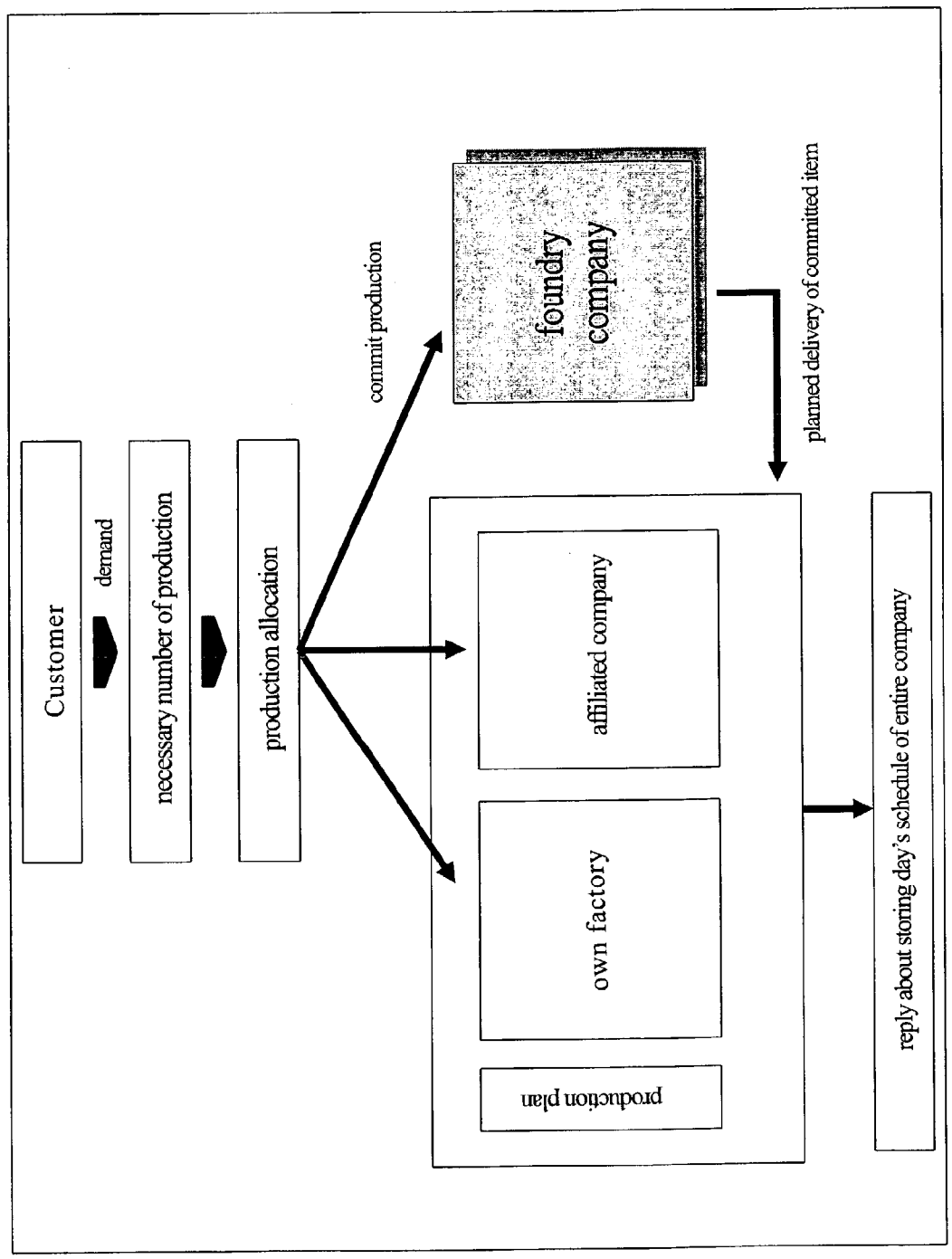
FIG. 13 is an explanatory view showing that a foundry company is fetched into a supply chain in the production management system shown in FIG. 1.
Figure 14:
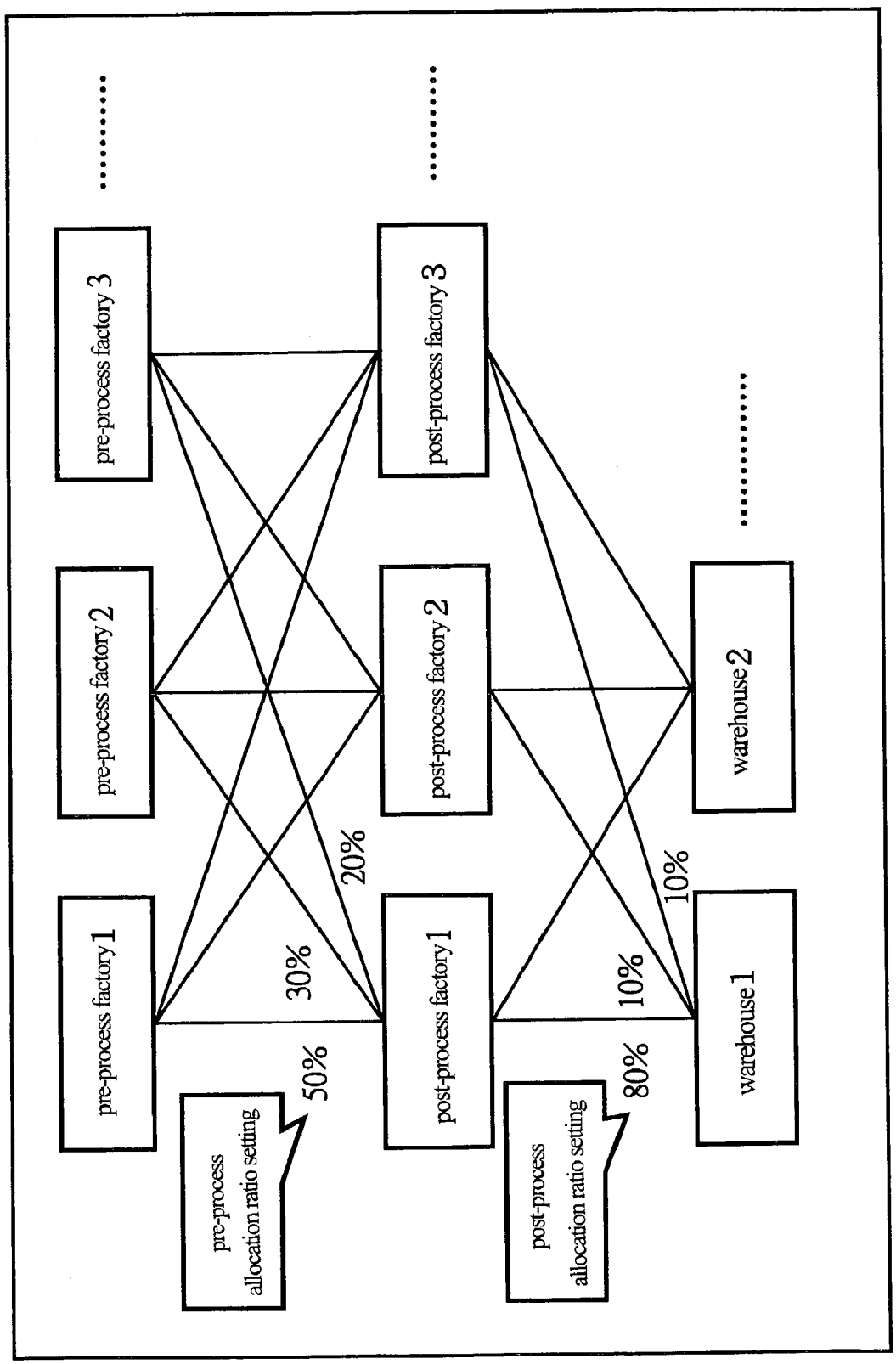
FIG. 14 is an explanatory view for the setting of production allocation ratios used when creating the production plan.
Figure 16:
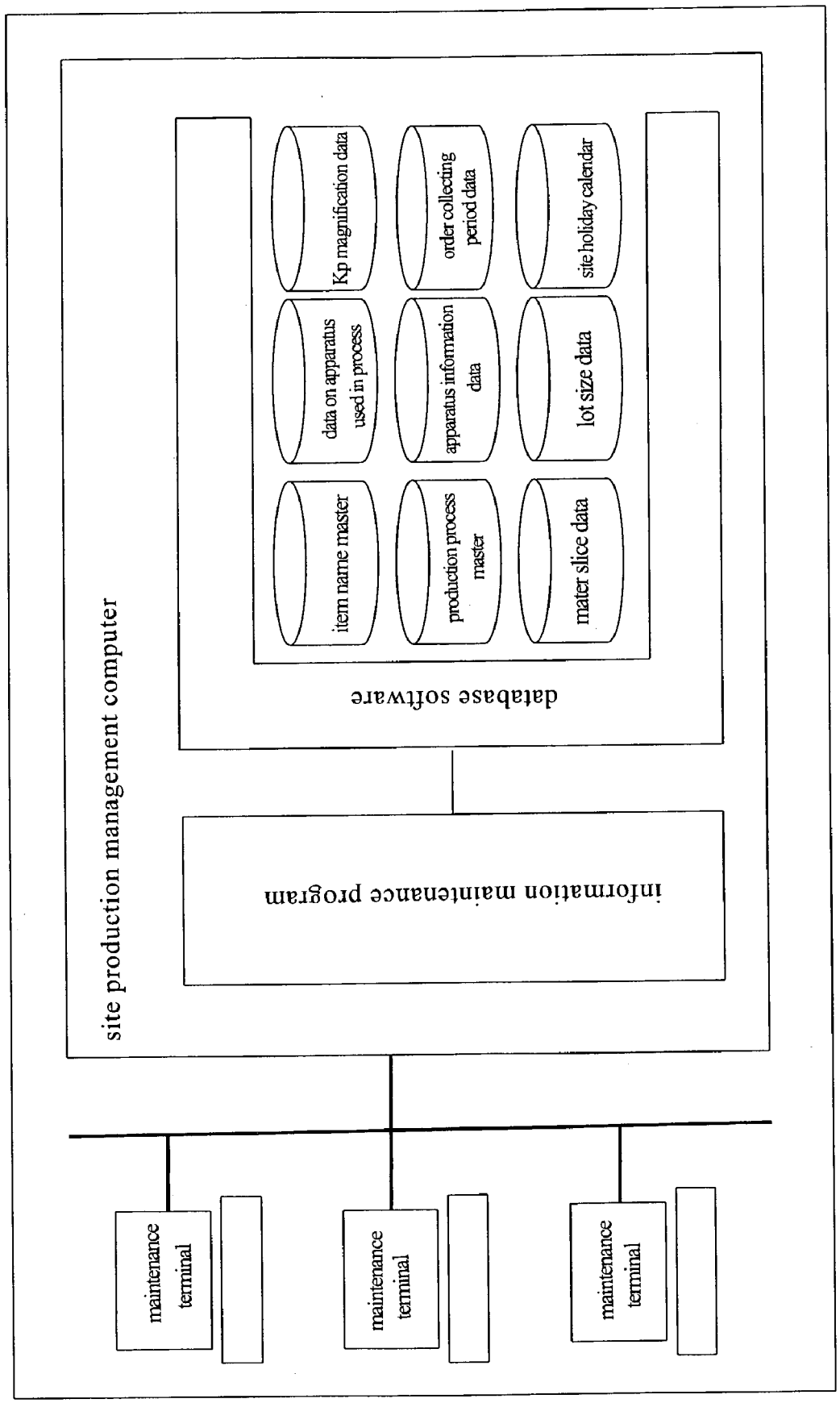
FIG. 16 is a block diagram showing the configuration of a production management computer provided in the production management system shown in FIG. 1.
Figure 17:
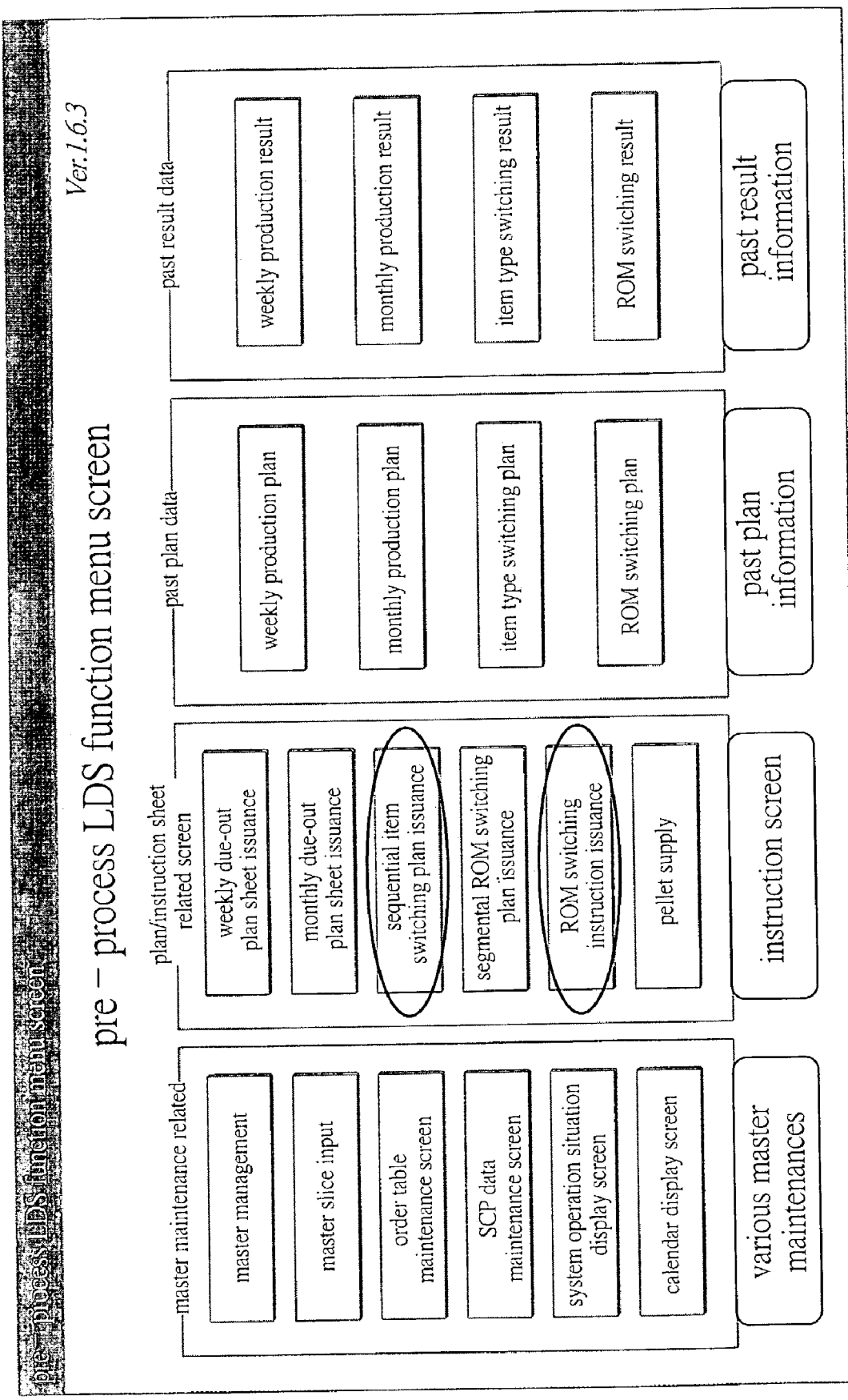
FIG. 17 is an explanatory view showing one example of a production instruction functional menu displayed on a production instruction search terminal provided in the production management system shown in FIG. 1.
Figure 18:
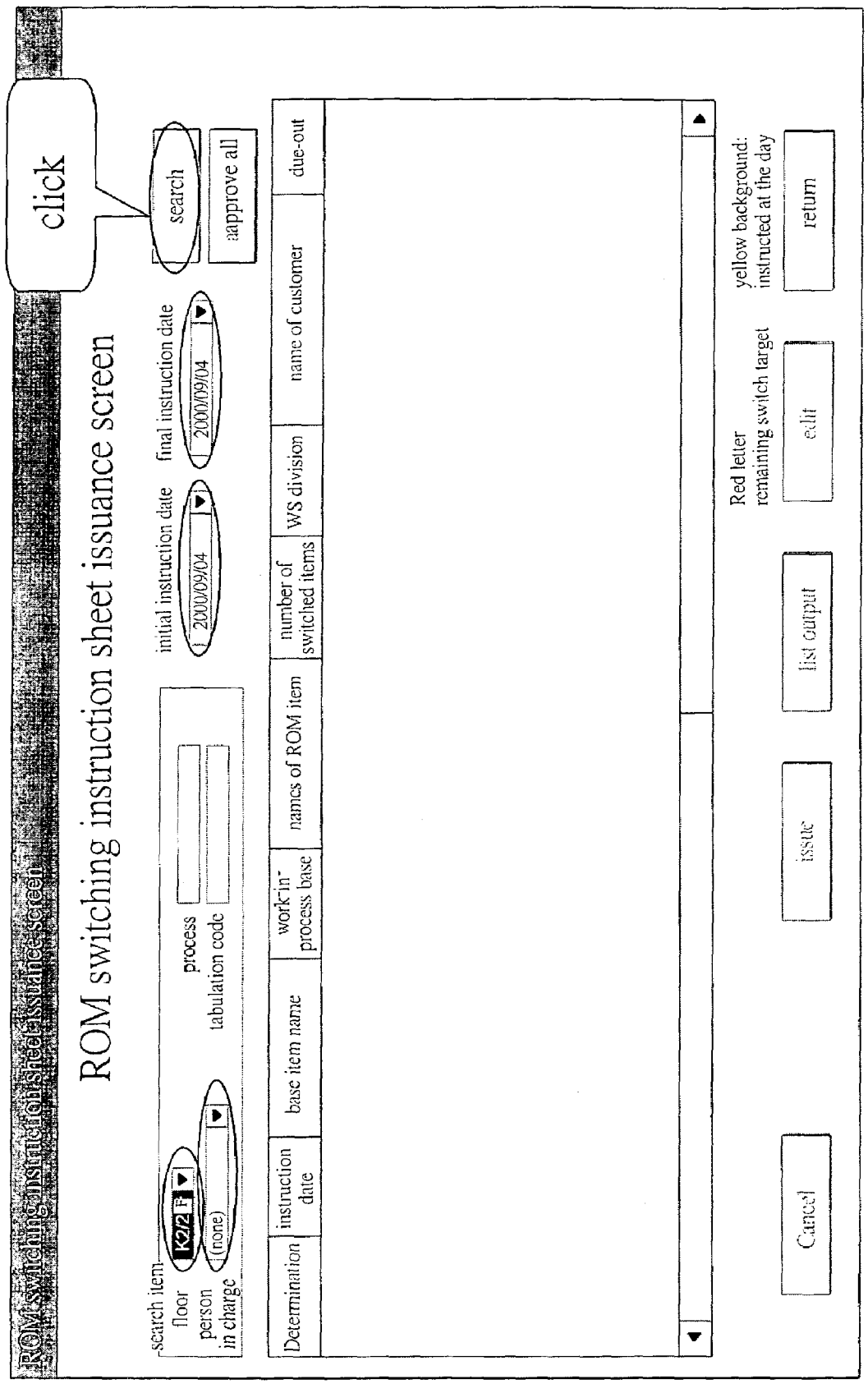
FIG. 18 is an explanatory view showing one example of a switching instruction to switch a base displayed on the production instruction search terminal to a semi-custom shown in FIG. 17.
Figure 21:
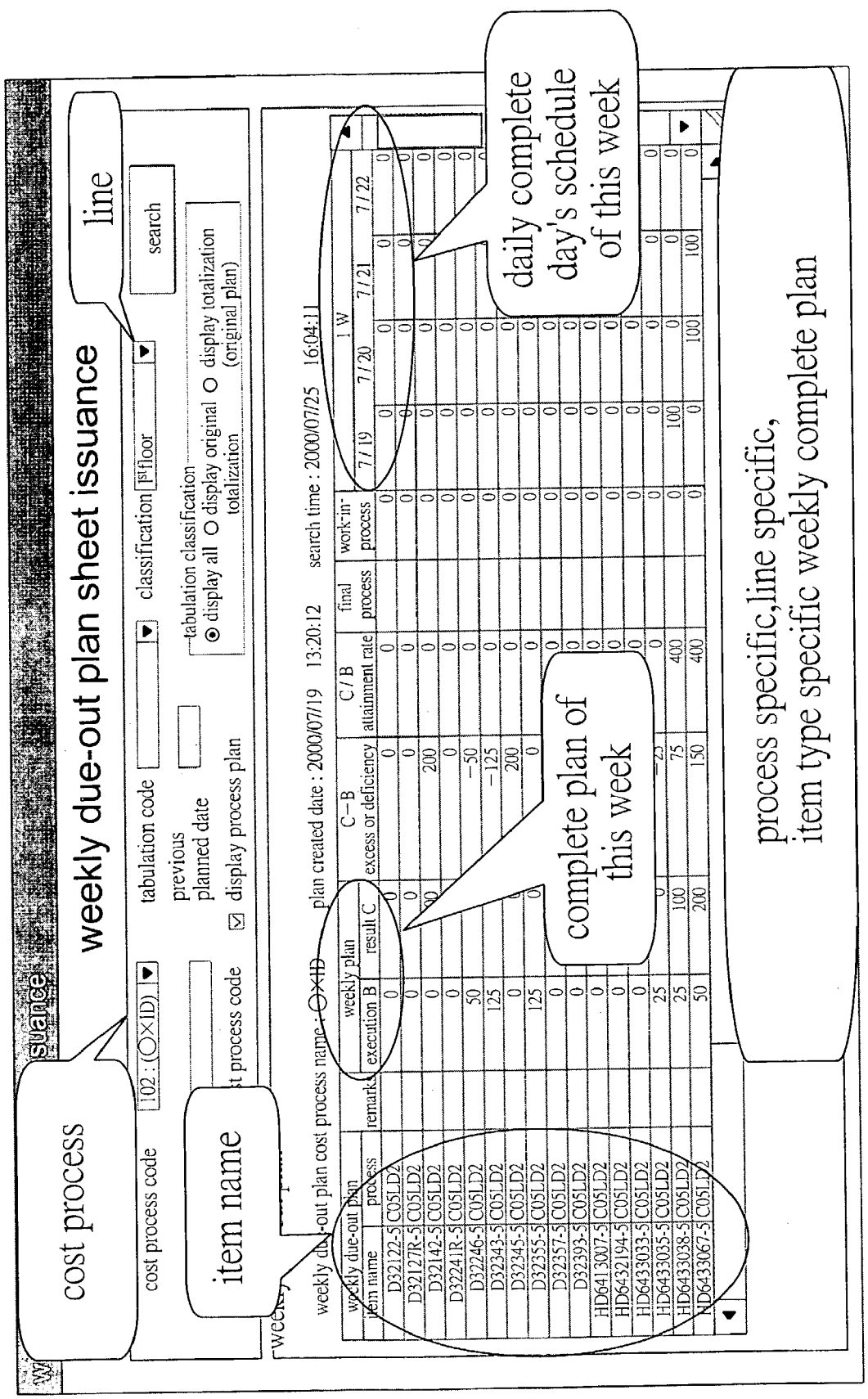
FIG. 21 is an explanatory view showing one example of a process specific production instruction screen displayed on the production instruction search terminal.
Figure 22:
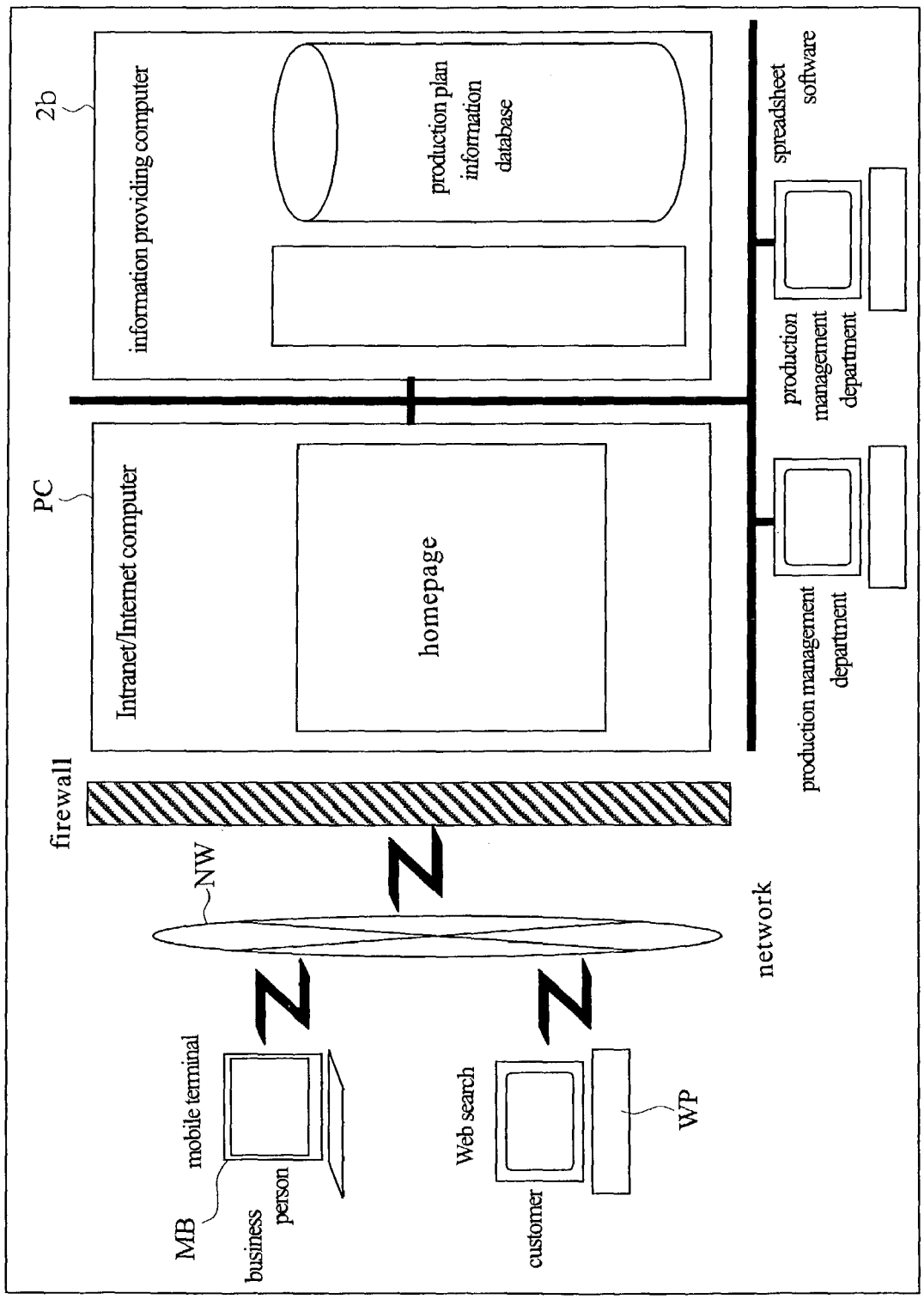
FIG. 22 is an explanatory view showing an environment of providing a production plan information to a customer.
Figure 23:
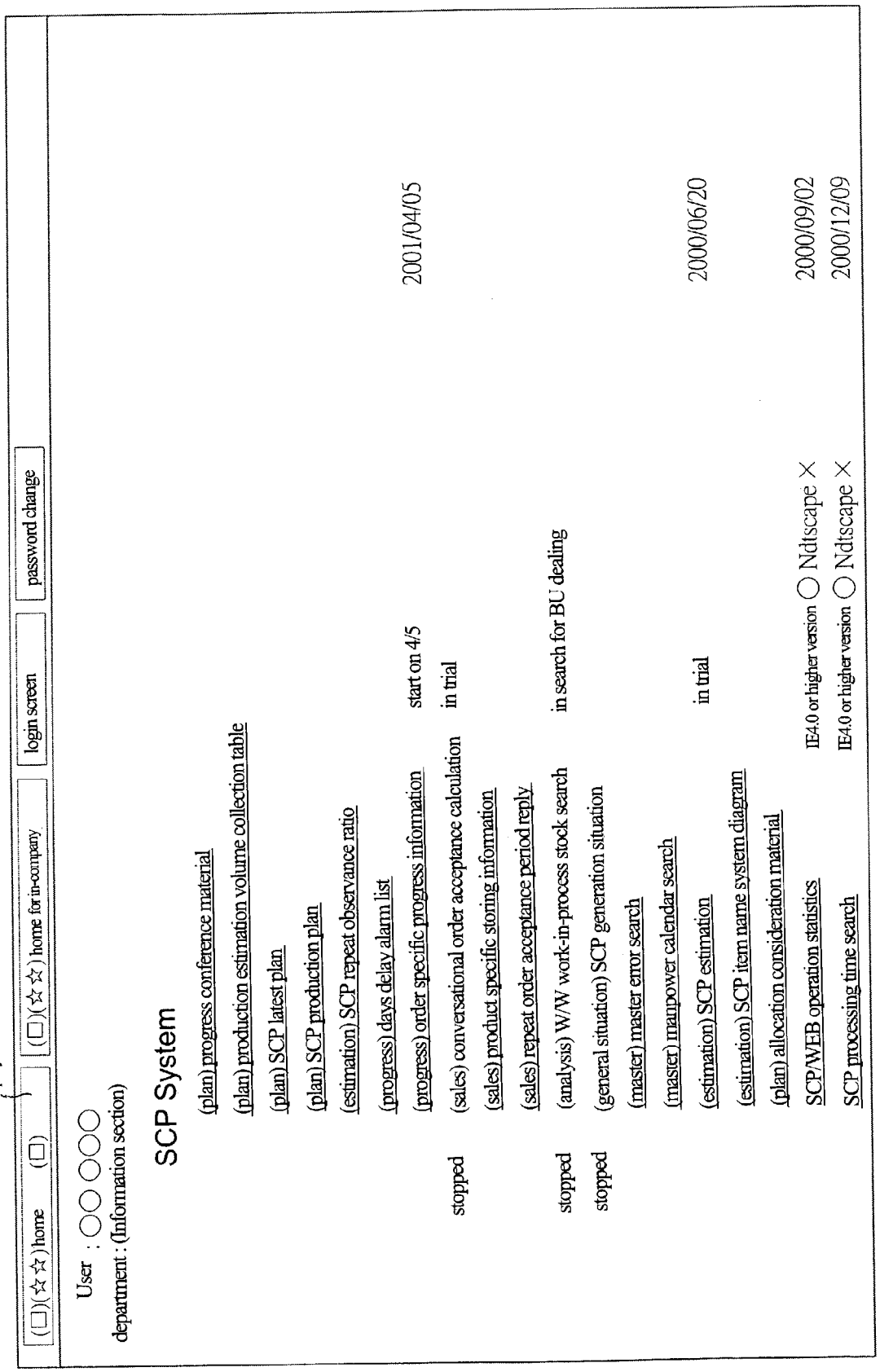

FIG. 1 is a block diagram showing the configuration of a production management system in one embodiment according to the present invention. FIG. 2 is an explanatory view of a supply chain in the production management system shown in FIG. 1. FIG. 3 is an explanatory view for information processing in the production management system shown in FIG. 1. FIG. 4 is a flow chart of a semiconductor device production management in the production management system shown in FIG. 1. FIG. 5 is an explanatory view showing the relationship among respective operation systems which constitute a semiconductor supply chain targeted by the production management system shown in FIG. 1. FIG. 6 is an explanatory view showing an operation flow for creating a production plan in the production management system shown in FIG. 1. FIG. 7 is an explanatory view showing one example of a production model which can be handled by the production management system shown in FIG. 1. FIG. 8 is an explanatory view showing one example of a production capability fetched by a center computer provided in the production management system shown in FIG. 1. FIG. 9 shows an example of display when process production capability data shown in FIG. 8 is fetched. FIG. 10 is an explanatory view for consistency check conducted by the center computer of the production management system shown in FIG. 1. FIG. 11 is an explanatory view showing one example of basic items of production planning information. FIG. 12 is an explanatory view showing the manner of display of the production plan shown in FIG. 11. FIG. 13 is an explanatory view showing that a foundry company is fetched into the supply chain in the production management system shown in FIG. 1. FIG. 14 is an explanatory view for the setting of production allocation ratios used when creating the production plan. FIG. 15 is an explanatory view showing an example of the display of the production allocation ratios shown in FIG. 14. FIG. 16 is a block diagram showing the configuration of a production management computer provided in the production management system shown in FIG. 1. FIG. 17 is an explanatory view showing one example of a production instruction functional menu displayed on a production instruction search terminal provided in the production management system shown in FIG. 1. FIGS. 18 to 20 are explanatory views showing one example of a switching instruction to switch a base displayed on the production instruction search terminal shown in FIG. 17 to a semi-custom. FIG. 21 is an explanatory view showing one example of a process specific production instruction screen displayed on the production instruction search terminal. FIG. 22 is an explanatory view showing an environment for providing a production plan information to a customer. FIG. 23 is an explanatory view showing one example of a production plan search information menu screen displayed on an order input terminal or the like. FIGS. 24 to 29 are explanatory views showing one example of provided information displayed on the order input terminal or the like.

In this embodiment, as shown in FIG. 1, the production management system 1 comprises a computer (production planning computer) 2, a production management computer 3, a production plan search terminal (site terminal) 4, a parameter input terminal (site terminal) 5, a production instruction search terminal (production instruction terminal) 6, a customer computer (situation check terminal) 7 and an order input terminal 8.

The computer 2 comprises a center computer 2a and a computer for providing information (database) 2b. The computer 2 is provided in an integral center which integrates the manufacturing sites (manufacturing factories) of semiconductor devices, or the like. This computer 2 unitarily manages the production planning, finishing and the like of semiconductor devices which are manufactured through a plurality of manufacturing factories.

Each of the manufacturing factories is provided with a respective production management computer 3, production plan search terminal 4, parameter input terminal 5 and production instruction search terminal 6. The production management computer 3, the production plan search terminal 4 and the parameter input terminal 5 are connected to the computer 2 over a network NW such as LAN or WAN.

The production instruction search terminal 6 is connected to the production management computer 3. The production management computer 3 totalizes production management information on the respective manufacturing factory and transmits the totalized information to the center computer 2a.

The production plan search terminal 4 searches and views the production plan for manufacturing semiconductor devices transmitted from the computer 2. This production plan search terminal 4 is also connected to the Internet NET which is an information network, so that the production plan can be searched and viewed over the Internet NET.

The parameter input terminal 5 inputs and corrects parameters which are necessary for the computer 2 to project the production plan, and searches the production plan for manufacturing semiconductor devices transmitted from the computer 2. The production instruction search terminal 6 searches the production instruction for manufacturing semiconductor devices transmitted from the computer 2.

The customer computer 7 is a computer owned by a customer which purchases semiconductor devices. The order input terminal 8 is a terminal which inputs demand information on the order from the customer.

The production management system 1 performs production management operations in response to a demand (a production plan based on orders from customers and demand estimation) in the supply chain shown in FIG. 2. Specifically, the system 1 creates the production plan of each factory and provides a production instruction to a manufacturing site based on the created plan on one hand. On the other hand, the system creates a storing reply and provides the reply to the customer as delivery time information.

Further, as shown in FIG. 3, in the production management system 1, the computer 2 intensively performs so-called centralized processing. Thus, the computer 2 collects demand information from the customer computer 7, the order input terminal 8 and the like and production management information from the production management computers 3, the parameter input terminals 5 and the like provided at the respective manufacturing sites.

The computer 2 creates a general production plan from the demand and order information on the whole of the enterprise. Based on the created general production plan, the computer 2, i.e., the center, creates the production plans of all the manufacturing sites and delivers the production plans thus created to users such as the respective manufacturing sites. The users, in turn, access the center and search the production plan.

Next, the flow of semiconductor device production management by the production management system 1 will be described with reference to the flow chart of FIG. 4.

First, based on the demand estimation of the customer and order information on the customer (in a step S101), a preliminary production plan is created (the necessary, additional volume of production is calculated in light of a stock status, a future demand and the like) (in a step S102).

An actual production plan (to be referred to as "production plan" hereinafter) including the number of produced and finished products, day's schedule and the like for each manufacturing site, each item and each process to satisfy the necessary volume of production is projected (in a step S103). In the processing of the step S103, pieces of information on the respective manufacturing sites are collected by the center in order to calculate them for the general optimum production plan of the whole of the enterprise, and the production plan is executed.

If the preliminary production plan (the possible volume of production) does not meet with the production plan (the necessary volume of production) (in a step S104), then production allocation, production capability, lead time, yield and the like are reviewed and parameters therefor are corrected (in a step S105), and the production plan is re-executed based on the corrected parameters (in the step S103).

In the case where the processing of the step S104 indicates that the production plan is satisfactory (in a step S106), the production plan is provided to the respective manufacturing sites as production instructions and to a business department employee, customer or the like as a reply to a stock inquiry or a reply to an order acceptance time inquiry (in a step S107).

Further, the plan and the actual result are compared and verified in a weekly cycle and a monthly cycle whether the production is executed according to the plan, respectively to thereby estimate a plan observance situation (in a step S108). In the case where the observance rate is low, the estimation result is fed back to a production management department through a regular conference so as to be used for the follow-up for improving the plan observance rate.

This production management flow is executed roughly in three cycles, respectively. In a monthly cycle, adjusted is the gap between the preliminary production plan, production instructions and the production plan, the possible volume of production. In a weekly cycle, the production instructions are issued to the manufacturing sites based on the production plan, the plan and the result are compared, and the observance situation is estimated. In a daily cycle, a reply to a stock inquiry following an order and a reply to an order acceptance period inquiry based on environmental change day by day (increase or decrease of demand, increase or decrease of production capability) are provided.

The relationship among respective operations and systems which constitute a semiconductor supply chain targeted by the production management system 1 is shown in FIG. 5. As shown in FIG. 5, the production management system 1 mainly covers the half-tone dot meshed operations and systems.

An operation flow of creating the above-stated production plan will next be described with reference to FIG. 6.

Necessary information is collected from the respective manufacturing sites and modeled into information necessary for the system. Using the model, the production plan is projected and the values of the plan and day's schedule are verified. In the case where the plan does not satisfy the production instructions and the delivery date, various parameters (production allocation ratios, apparatus capabilities, yield and the like) are reviewed and the production plan is re-projected.

In the case where the production plan satisfies the production instructions and the delivery date, the production plan is fed back to the respective manufacturing sites as production instructions and information on the production plan is provided to the business or customer side as a reply to a stock inquiry and a reply to an order acceptance period inquiry in response to the order or demand.

FIG. 7 shows a production model which can be handled by the production management system 1.

As shown in FIG. 7, the production management system 1 supports the semiconductor device production management comprising those of a plurality of pre-process manufacturing sites/factories, a plurality of post-process manufacturing sites/factories, and a plurality of warehouses.

Besides the production model shown in FIG. 7, the production management system 1 can handle a production distribution consisting of, for example, a plurality of pre-processes and one post-process or one pre-process and a plurality of post-processes. Further, the sites/factories can fetch not only the company and affiliate companies but also foundry companies into the supply chain.

Next, the operation of the production management system 1 in this embodiment will be described in detail.

The operation of the computer 2 will first be described.

Necessary information is input into the computer 2 from the production management computer 3, the customer computer 7 and the order input terminal 8 every period (e.g., every day).

This necessary information comprises production instructions, work-in-process lots, an item name master, a process master, a process flow, a master slice, allocation ratios, yield, apparatus information, process/apparatus related information, apparatus processing time, Kp magnification, process completion, a calendar, lot sizes, order collection period and the like.

The production instruction information is on production instructions based on demand, an order from a customer and the like. The work-in-process lots are information on the number of semi-finished lots pending in the production processes. The item name master is information on the names of items. The process master is information on the intensive production processes for each item name.

The process flow is detailed production process information on each production process. The master slice is information indicating the parent-child relationship among the item names. The allocation ratios are information indicating production sites for each product name and representing production ratios of the respective manufacturing sites.

The yield is an estimated good product acquisition rate for each product or each process. The apparatus information is information on the apparatus type of each manufacturing apparatus and the number of processible products of each manufacturing apparatus. The process/apparatus related information is information on apparatuses used in each manufacturing process.

The apparatus processing time is information on processing time required when a certain apparatus is used in a certain process. The process completion information is the lead time of manufacturing processes for each item.

The Kp magnification is a factor for calculating actual processing time (actual time=physical time×factor). The calendar is calendar information on holidays and business days at each manufacturing site.

The lot sizes are information on the volume of items (pre-process: the number of wafers, post-process: number of products) which can be stored in each lot which is a production unit. The order collecting period is information on a period for collecting orders when some orders are collected and production is started.

Among these pieces of necessary information, the production instruction information is input into the center computer 2a from the customer computer 7, the order input terminal 8 or the like, while the other information is input into the center computer 2a through the production management computer 3.

The center computer 2a creates process production capability data from, for example, the products to be manufactured, the process flow, the apparatus information, the process/apparatus related information and the apparatus processing time as shown in FIG. 8. FIG. 9 shows an example of the display of the created process production capability data. FIG. 9 shows an example of the display of the created process production capability data.

The center computer 2a matches the manufacturing apparatus code used in each process of the process flow to the processing time, the number of apparatuses and the apparatus type information included in the apparatus information data from the process production capability data, thereby making it possible to grasp the production capability of the process.

Thereafter, the center computer 2a checks the consistency of the necessary information input from the respective manufacturing sites and the like.

First, item specific process flow data is created based on the item name master, the process flow, the master slice and the like. As shown in FIG. 10, the center computer 2a checks the consistency of collected information by comparing this item specific process flow data, yield, allocation ratios, work-in-process lots and the above-stated process production capability data.

After checking the consistency, the center computer 2a sets the process production capability data as a constraint used when projecting the production plan, and projects the production plan using the other necessary information, thus generating the basic content of the production plan information.

The center computer 2a verifies the plan values and day's schedule included in the production plan information. In the case where they satisfy the production index number, the delivery date and the like, the center computer 2a stores this production plan information in the database of the information providing computer 2b.

As shown in FIG. 11, the production plan information involves information on, for example, factories, item names, cost process (process master), operation steps, works in process, actual result, production plan and the like.

Further, the consistency situation checked by the center computer 2a can be searched by the production plan search terminal 4 or the like. By searching this information, it is possible to grasp the relationship among the items, the production allocation ratios of the respective sites and the like at glance, so that the search is effective for the validity check of the production flow, the allocation ratios and the like.

As shown in FIG. 12, the display form of this production plan includes process-in-charge code representing a manufacturing site, code representing a stage which is a collection of a plurality of processes on the flow, item name, item name code, cost department, factor for converting the theoretical processing time of logical apparatus into actual processing time, production allocation ratios of the next five months, the number of operations (OP) in each stage, estimated yield used for the plan, processing time for an initial lot or an initial wafer (F), processing time for second and the following lots or wafers (I), the number of work-in-process items in a present stage, the number of work-in-process lots and the like.

While FIG. 12 shows an example of the flow from upstream to downstream of production, search from downstream to upstream can be also done.

The production plan information generated by the computer 2a is delivered to the production plan search terminal 4 and the like provided at each manufacturing site, and the numerical values, day's schedule and the like of the production plan information are verified at each manufacturing site.

As a result of this verification, when the numerical values, day's schedule and the like of the production plan information do not satisfy the volume of production instructed, the delivery date and the like, the production plan is projected based on the various parameters such as the production allocation ratios, apparatus capabilities, yield and the like input again from the parameter input terminal 5.

Now, a method for fetching a foundry company into the supply chain will be described.

As shown in FIG. 13, by acquiring, from the foundry company, the delivery estimation date of a product of which the production is committed to the foundry company, and by fetching the acquired delivery estimation date into the production management system 1 as input information to be input into production processes after committing the production to the foundry company, it is possible to create a storing reply and a production plan for the production of the entire company.

As shown in FIG. 7, in the semiconductor manufacturing model, the production allocation is provided as one of the important factors for creating the production plan. In other words, when one item is manufactured at a plurality of factories, it is necessary to determine what percentage of the estimated volume of the target production each factory has to be allocated to the production.

In this case, as shown in FIG. 14, the allocation ratios of the production can be set as a parameter and the ratios can be set as two stages, i.e., the allocation ratios of pre-process factories and those of post-process factories for each item name.

Further, in manufacturing semiconductor devices, the production allocation ratios therefor are to be normally changed because of the strategic reshuffle of the update of manufacturing facility, a demand fluctuation and production items or the like. Therefore, as shown in FIG. 15, the production allocation is not fixed but can be changed every month.

Next, the operations of the production management computer 3, the production plan search terminal 4, the parameter input terminal 5 and the like provided at each manufacturing site will be described.

The configuration of the production management computer 3 is shown in FIG. 16. Maintenance terminals 3a in addition to the production instruction terminal 6 are connected to the production management computer 3.

The database of the production management computer 3 stores necessary information for constructing a production model. In the case where it is necessary to update various pieces of information such as the production of a new product, the development of a new process, the improvement of an apparatus, the use of a new apparatus and the like, information is updated from each maintenance terminal 3a.

A production instruction functional menu displayed on the production instruction search terminal 6 will be described.

Production instructions are executed in point processes to be managed particularly intensively in the manufacturing of semiconductor devices. They include an initial process start instruction of each of the pre-process and the post-process; a switching instruction to switch a common process part (a process part in which wafer-processings and wirings are common, to be referred to as "base" hereinafter) to a specific process part (a process part in which wirings are arranged in accordance with the specification required by a customer, to be referred to as "semi-custom" hereinafter) for a semi-custom item the production process of which is initially common in the pre-process but which is changed according to a customer specification after a certain step; an item switch (master slice) instruction for switching one work-in-process item to another item; a photo-process start instruction to start a photo-instruction which tends to become a bottleneck due to the features of the operation and apparatus thereof in the pre-process; a wafer testing step start instruction in the pre-process; a wafer due-out process instruction from the pre-process site to the post-process site; and a finishing and product storing instruction in the final process of the post-process.

The production instruction function will be described while taking the switch instruction to switch the base to the semi-custom as an example.

As shown in FIG. 17, the production instruction functional menu displayed on the production instruction search terminal 6 is the same as the maintenance menu for the database of the production management computer 3 described above. Information necessary for the site production management is accessed from one menu screen.

For example, when a person who issues a switch instruction to switch the base to the semi-custom clicks a ROM switch instruction sheet issuance button in the menu, a ROM switch instruction data search screen which is a screen for the switching instruction to switch the base to the semi-custom is displayed as shown in FIG. 18.

When the person clicks a search button after inputting predetermined items, a list of data for which a switching instruction should be issued within a designated period is displayed as shown in FIG. 19. As for the data which is determined to be switched after checking the data, determination boxes are checked and an issuance button is clicked, whereby a switching instruction sheet is issued. The switching instruction sheet is transmitted to a manufacturing site, to allow the manufacturing site to perform a switching operation as shown in FIG. 20.

FIG. 21 shows one example of a process specific production instruction displayed on the production instruction search terminal. In FIG. 21, the code of a process for which a production instruction is issued is input in the cost process code box and the search button is clicked, whereby the production plan information on the process is displayed.

The item names, processes, the estimated number of finished items, the actual result, and the attainment rate of each item for a present week, and the daily estimated number of finished items for previous two weeks are displayed. Using these pieces of information, it is possible to grasp the weekly production target management and future daily targets, to suppress the delay of delivery date and improve production efficiency by making preparation of production in advance.

Next, a method for providing the production plan information to a customer will be described.

As shown in FIG. 22, a web terminal WP and a mobile terminal MB owned by a customer and a business person are connected to an Intranet/Internet computer PC through the network NW.

This Intranet/Internet computer PC is connected to the information providing computer 2b. In response to the request of a customer or a user, a production plan information search program is started and the content of the production plan information database of the information providing computer 2b is provided to the customer and/or the user.

In this case, the customer or the user accesses the Intranet/Internet computer PC through the network NW from the web terminal WP or the order input terminal 8 owned by the customer or user, displays a corresponding homepage, and selects a production plan search system from the content of the homepage.

As shown in FIG. 23, a search information menu screen is displayed on the web terminal WP or the order input terminal 8. The customer or the user executes a search while selecting corresponding information from the menu in accordance with a content to be searched.

Now, one example of provided information displayed on the web terminal WP, the order input terminal 8 or the like will be shown below.

Figure 24:
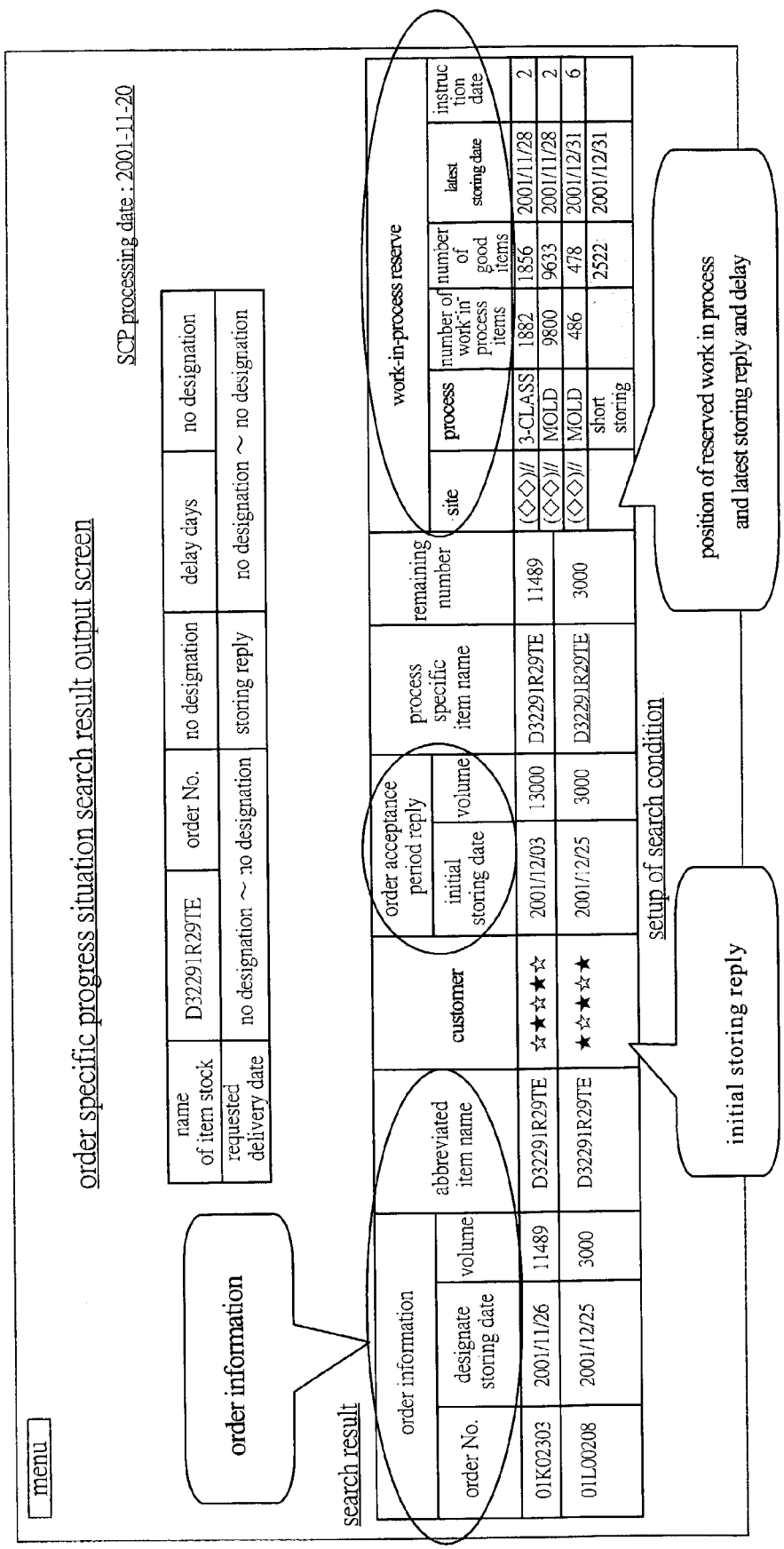

FIG. 24 shows a screen for showing the position of a work-in-process lot, a reserve situation, a storing estimation date or the like corresponding to the order or production instruction from the customer or user. On this screen, an initially presented storing reply in response to an order, a latest storing reply which enables the customer or user to grasp the present situation of the storing situation, the progress and present work-in-process position of the reserved work-in-process lot and the like are presented to the customer or the like.

FIG. 25 shows a screen for displaying information referred to by the customer when presenting the order acceptance date. For the name of the item referred to by the customer, the volume and requested delivery date of the item, the volume and date of the item which can be delivered are displayed.

As a result, the business person or the user can swiftly reply to the customer about the order acceptance period. If the customer knows the order acceptance period and finds the content satisfactory, the customer places a formal order.

FIG. 26 shows a screen for displaying a storing reply to each order.

An order reception side corresponding to the name of department or section and a department or section code, an orderer corresponding to the name of a customer and a customer code, a management code corresponding to a classification code for classifying each item, an item name, an order No., a delivery date of the order, a storing instruction date which is a delivery date reset in light of a storing estimation date, the number of remaining orders, a stock reserve which is the number of items in stock which are already reserved for the order, an arrangement date which is a date at which the order is input into the computer, a delay which is the difference between the delivery date of the order and the latest storing estimation date, the latest storing estimation date which is a storing estimation date to date, and an initial storing estimation date which is the storing estimation date initially presented for the order are displayed for each order on the screen.

From this screen information, the customer or user can grasp the time at which the order which the customer or user placed is delivered to the customer. Since the production fluctuation of semiconductor devices is large due to various factors, the latest storing estimation date in light of the present situation is displayed for this information.

Furthermore, using a spreadsheet software, information is provided based on an information download function. This function is effective for a department and an operation which require a large quantity of information which includes not only information on each item but also information on all items and all processes.

In this case, on a screen as shown in FIG. 27, the user selects information to be downloaded. According to the selected information, the user also selects necessary information range (sites, factories, lines) as shown in FIG. 28.

Figure 28:
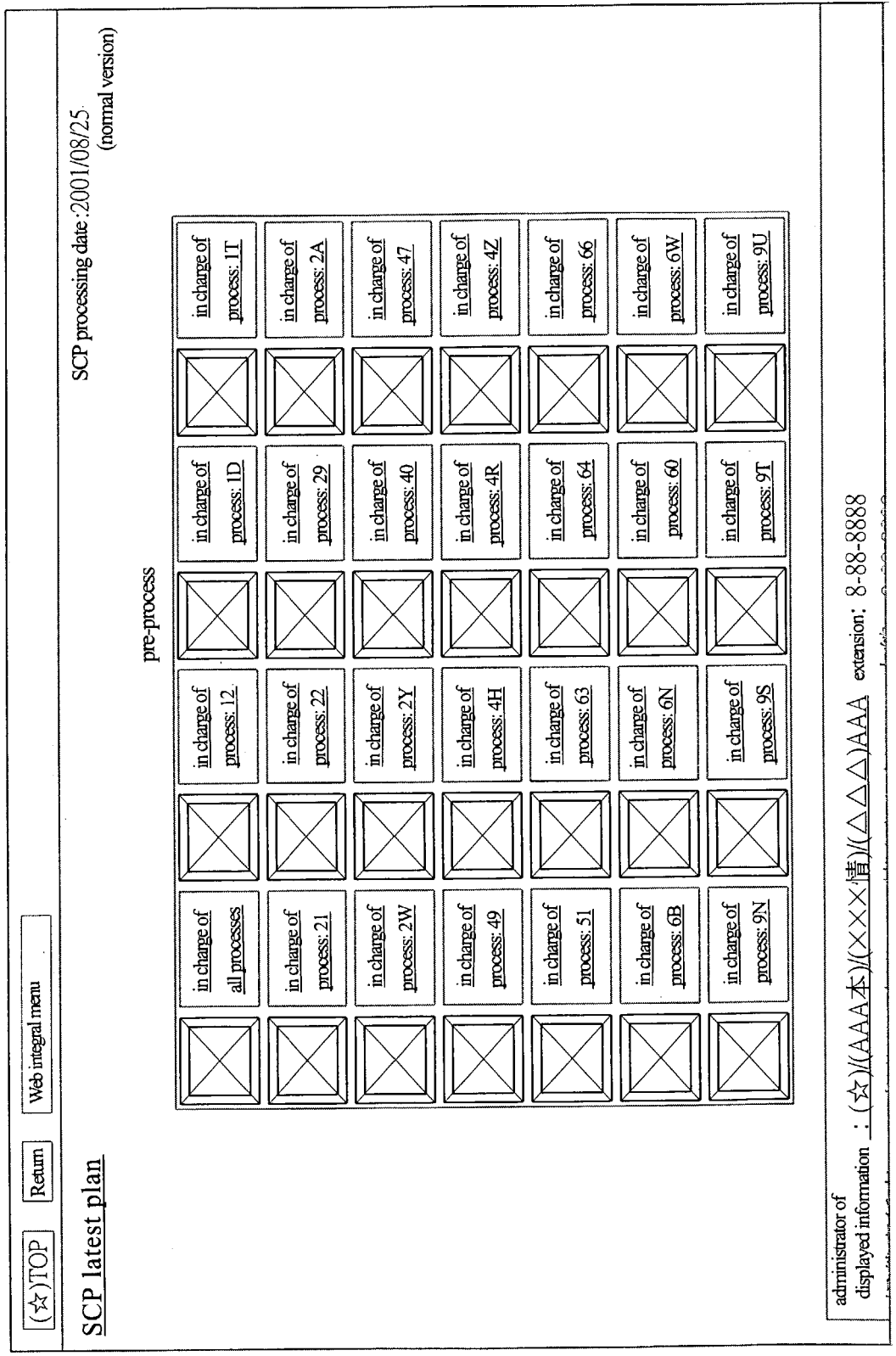
FIG. 28 is an explanatory view showing one example of provided information following that shown in FIG. 27.

Further, when the user clicks an icon which shows the range on the necessary information range select screen of FIG. 28, information is copied to a spreadsheet of the spreadsheet software and downloaded to the terminal of the user as shown in FIG. 29. The data represents the daily number of finished estimation products for each manufacturing site, each item and each process. The user manufactures semiconductor devices so as to attain the estimated number.

According to this embodiment, the production management system 1 can reduce the production lead time of the entire production supply chain and optimize the volume of work-in-process in accordance with appropriate production instructions.

Further, it is possible to improve CS (customer satisfaction degree) which enables the storing estimation day reply and the order acceptance reply which are delivery date information according to the actual situation to be presented to the customer or the like.

The present invention has been described concretely based on the embodiment of the invention made by the inventors of the present invention. However, the present invention is not limited to this embodiment and can be changed in various ways consistent with its broader scope.

The advantages attained by typical aspects among those disclosed by the present application will be briefly described as follows.

(1) Since the highly accurate production instruction plan can be efficiently projected in short time, it is possible to reduce the production lead time of the entire production supply chain and to optimize the volume of work-in-process in accordance with appropriate production instructions.

(2) Because of the advantage (1), it is possible to reduce the manufacturing cost of the semiconductor device.

(3) Further, by presenting delivery date information according to an actual situation, it is possible to improve the satisfaction of the customer.

What is claimed is:

1. A system for planning production of semiconductor devices, each manufactured using a plurality of manufacturing sites which include pre-process and post-process factories, said system comprising:

a respective plurality of site terminals provided at each manufacturing site, and collecting production management information on that manufacturing site;

a respective production management computer provided at each manufacturing site, the production management computer totalizing a plurality of pieces of the production management information collected by the corresponding site terminals, and transmitting the totalized production management information according to a request; and a production planning computer provided at a center and which collects the totalized production management information transmitted from each production management computer as necessary information and, based on the necessary information, projects respective production plans for the pre-process and post-process factories, according to which plans each process satisfies a necessary volume of production.

2. The system according to claim 1, wherein a foundry company entrusted with production is provided at each of the manufacturing sites.

3. The system according to claim 1, wherein the production planning computer checks a production distribution and a production constraint from the necessary information, and projects the production plans based on a check result.

4. The system according to claim 3, wherein the production constraint includes a condition for quantitatively grasping a capability of a manufacturing apparatus and a capability of a facility.

5. The system according to claim 1, wherein the production planning computer sets respective production allocation ratios for the manufacturing sites and projects the production plans based on the production allocation ratios.

6. The system according to claim 1, wherein each pre-process factory and each post-process factory includes at least one production line.

* * * * *